United States Patent [19]
Abbott et al.

[11] Patent Number: 5,474,393
[45] Date of Patent: Dec. 12, 1995

[54] COMPACT REMOTE-DRIVEN ENCODER

[75] Inventors: Jack E. Abbott, Everett; James M. Graverholt, Woodinville; Kevin M. Bagley, Everett; Stuart G. Donaldson, Kirkland; William L. Landsborough, Bothell, all of Wash.

[73] Assignee: Maverick International, Inc., Mukilteo, Wash.

[21] Appl. No.: 123,001

[22] Filed: Sep. 16, 1993

[51] Int. Cl.⁶ ................................ B41J 5/00; B41J 4/133
[52] U.S. Cl. .......................... 400/105; 400/624; 400/625; 400/641; 400/157.2; 101/93.48
[58] Field of Search ............................... 400/207 E, 219, 400/239, 157.1, 157.2, 605, 624, 625, 629, 102, 103, 104, 105, 579, 602, 633, 641; 101/93.04, 93.48; 271/109, 110, 111, 227, 228, 258, 259

[56] References Cited

U.S. PATENT DOCUMENTS

| | | | |
|---|---|---|---|
| 3,556,002 | 1/1971 | Bragg | 101/93.48 |
| 4,768,892 | 9/1988 | Brown et al. | 400/157.2 |
| 4,821,049 | 4/1989 | Eckl | 400/633 X |
| 4,991,983 | 2/1991 | Graverholt | 400/105 |
| 5,108,209 | 4/1992 | Menzenski | 400/208 X |
| 5,115,739 | 5/1992 | Cargill | 101/91 X |

FOREIGN PATENT DOCUMENTS 0059583  3/1988  Japan ................... 400/219

*Primary Examiner*—Chris A. Bennett
*Attorney, Agent, or Firm*—Jensen & Puntigam

[57] ABSTRACT

A remote-driven encoder which includes a feed tray assembly (12) and an autofeed roller assembly (14) which moves checks one at a time into a check guide path. The check is moved along the check guide path by first and second drive assemblies (16, 20). Intermediate of the two drive assemblies (16, 20) is an encoder assembly (18) and a ribbon cartridge (22). The apparatus includes a plurality of sensors which provide information for control of the movement of the check, including a preload sensor (70), a detect sensor (88), and a leading edge sensor (90), among others. The check moves through a substantial angle from the feed tray past the encoder assembly. The encoded check is moved around an eject roller and then into a catch tray at the rear of the apparatus.

38 Claims, 20 Drawing Sheets

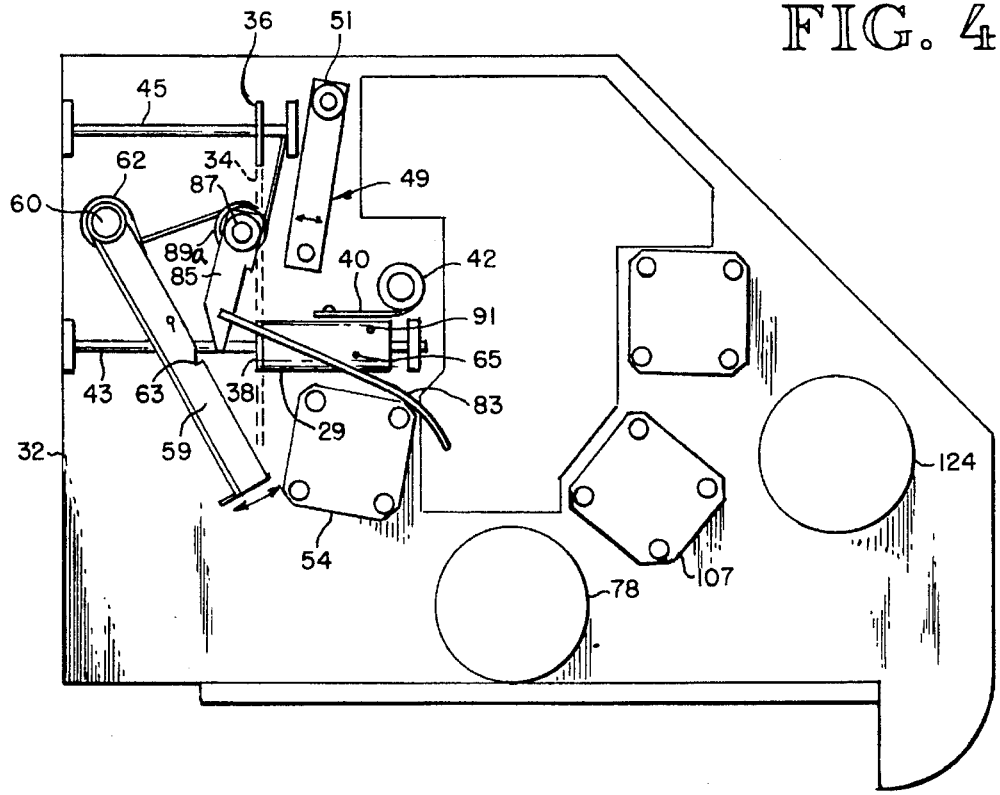
FIG. 4
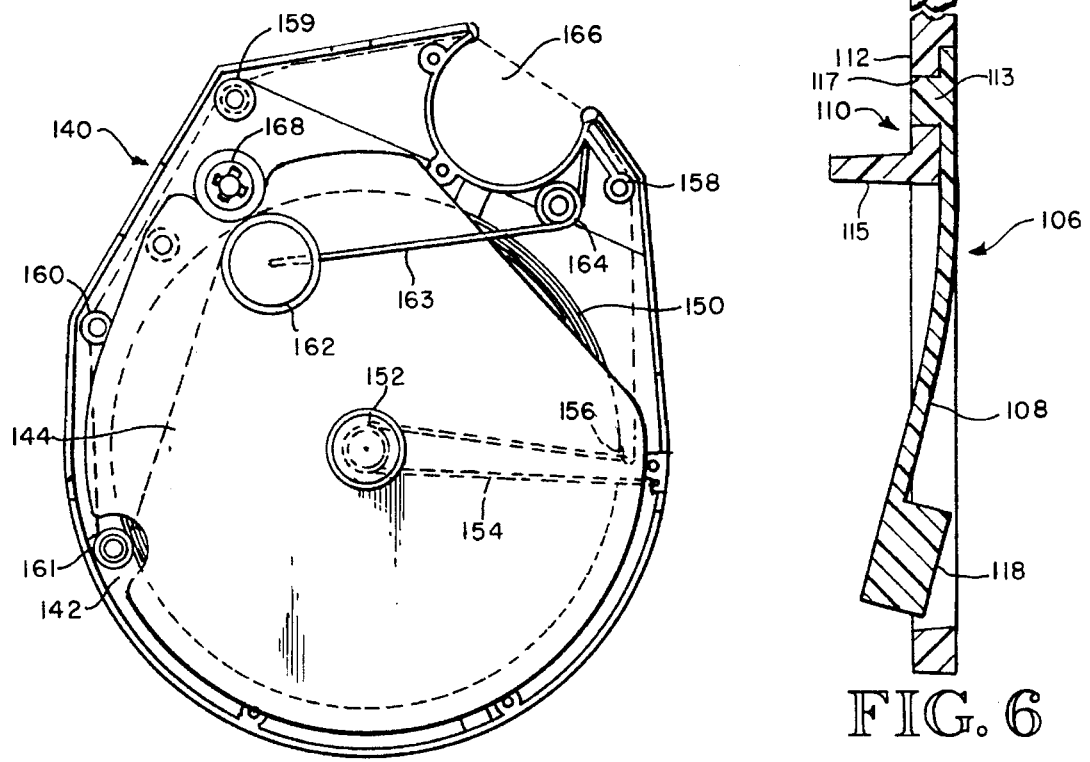
FIG. 5
FIG. 6

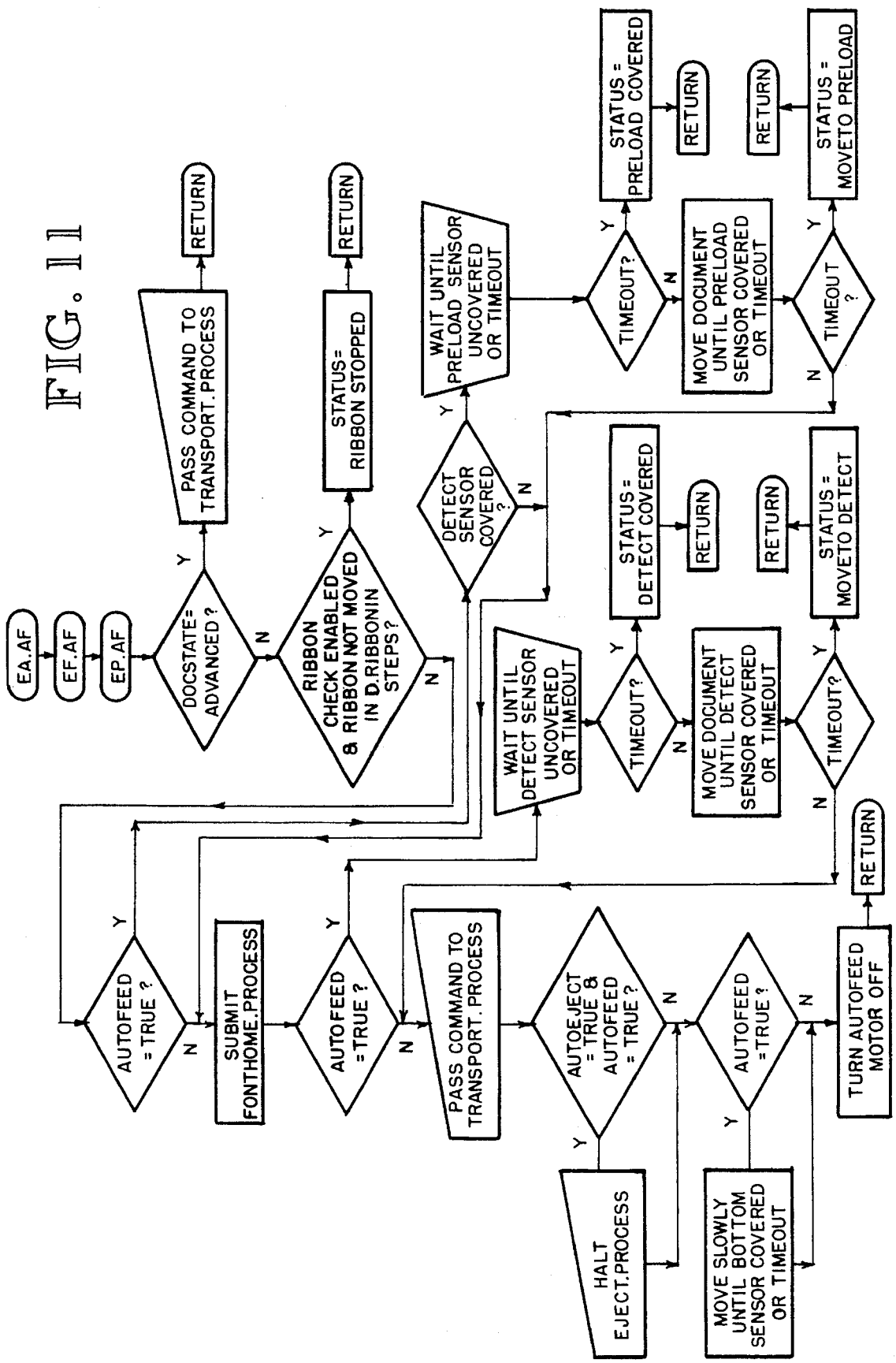

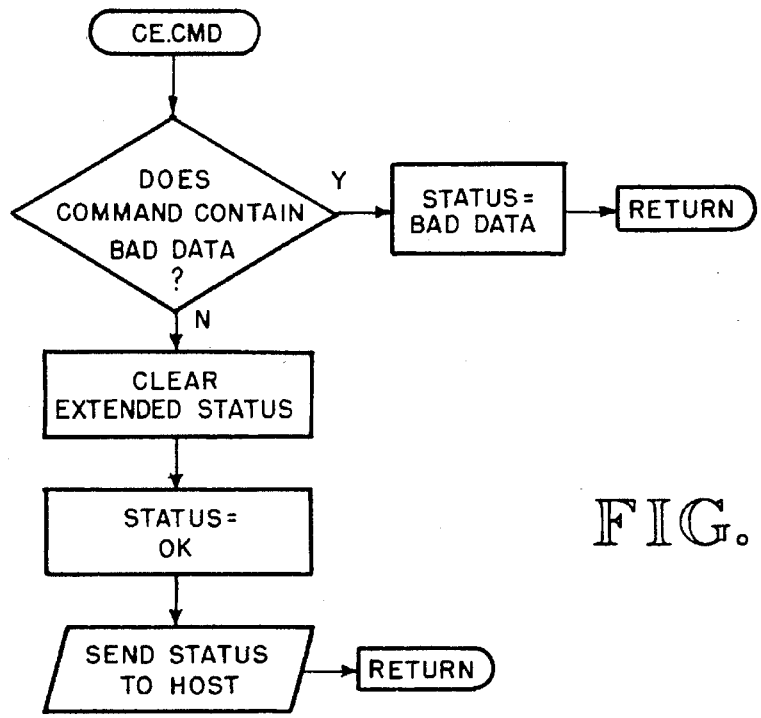
FIG. 32
FIG. 33
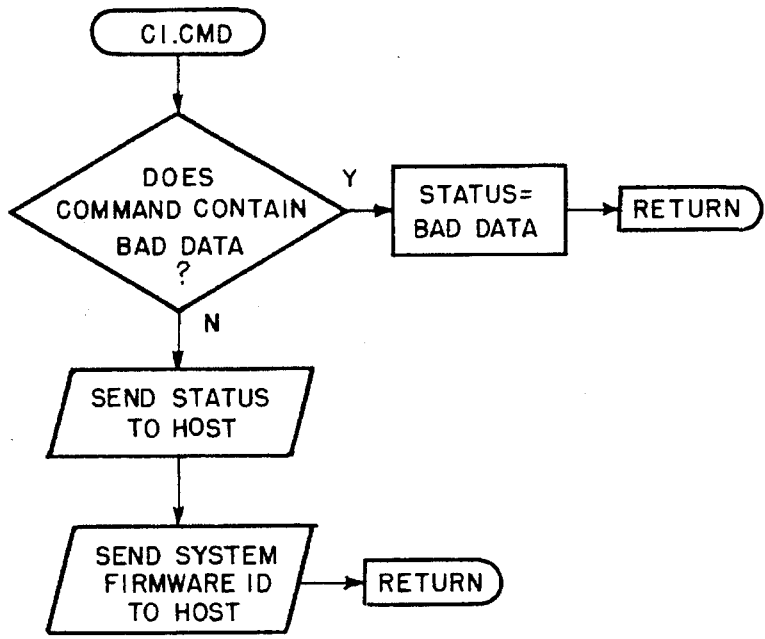

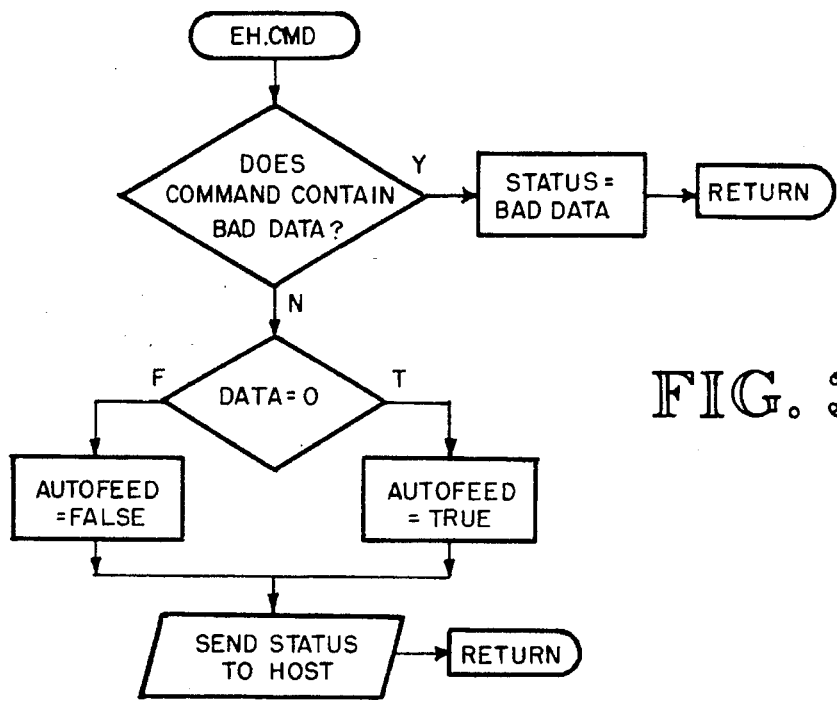
FIG. 34
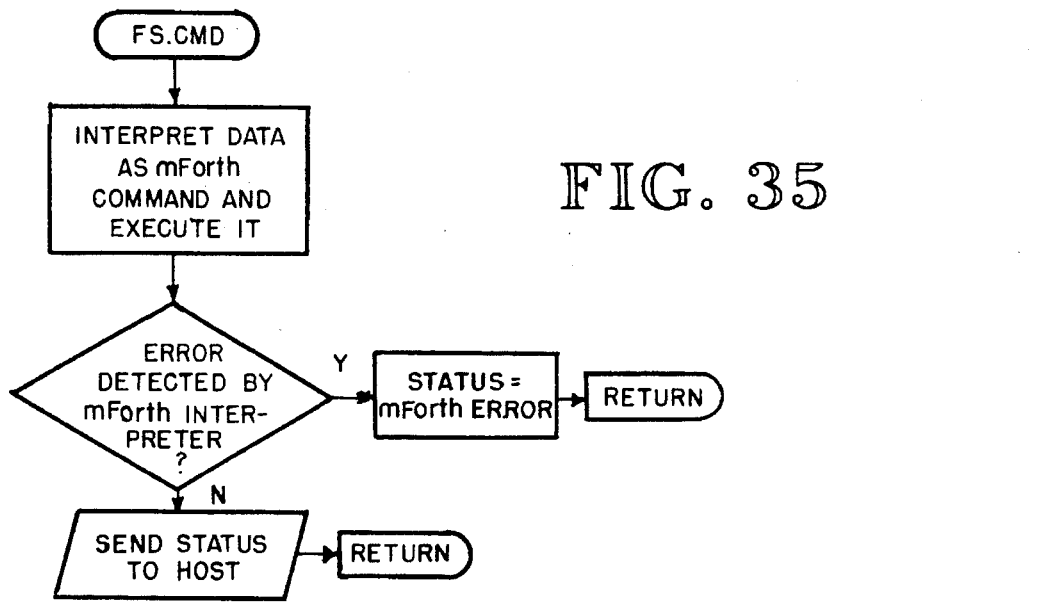
FIG. 35
FIG. 36
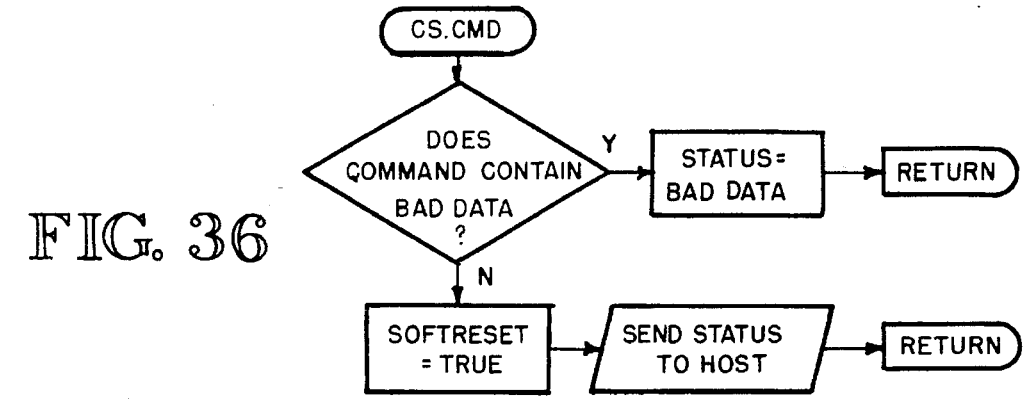

COMPACT REMOTE-DRIVEN ENCODER

TECHNICAL FIELD

This invention relates generally to the art of document encoders and more specifically concerns such an encoder which is remotely driven by various devices or systems.

BACKGROUND OF THE INVENTION

Document encoders are used in a variety of situations to accomplish a number of different tasks, among them the encoding of checks. Checks are encoded to facilitate processing thereof against an account. The encoding is typically done at the bank or other central facility. It is often desirable, however, to encode checks with the required information at the retail level, such as at a grocery store, so as to decrease the overall processing time of those checks through the banking system. In such a situation, encoders are used as part of an overall cash settlement system and are driven by the central processor portion of the system, instead of operating as a stand-alone instrument. Currently available encoders attempting to operate in such a system context, however, have a number of deficiencies. Typically, they are not fast enough and hence do not provide sufficient document throughput. In addition, such encoders are frequently too large for convenient use at the retail level and also typically require a substantial amount of hand labor to operate. Further, such encoders have not been reliable in operation and thus are frequently maintenance intensive.

The present invention is a compact encoder apparatus designed to be used as part of an overall cash settlement or comparable system. The apparatus features an automatic check feeding system and a convenient check catch tray, both which are designed to be integral parts of the apparatus. A particular structural arrangement of system elements defining a check guide path results in the present invention overcoming many of the difficulties encountered with prior art encoders.

SUMMARY OF THE INVENTION

Accordingly, the present invention is a compact, remotely driven MICR encoder, which includes: a tray for storing documents, such as a check, to be encoded; means for moving the documents from the tray into a document guide path, wherein in operation of the apparatus the documents contact and move around a portion of the document moving means, wherein the document guide path includes a portion located immediately downstream from the document moving means, into which the document moves upon leaving contact with the document moving means, the first portion extending at a substantial angle relative to the orientation of the document when it initially comes into contact with the document moving means. The apparatus further includes means positioned along the document guide path for encoding the document, means for moving documents past the encoding means and means for moving the encoded document away from the encoding means.

BRIEF DESCRIPTION OF THE DRAWINGS

FIG. 4 is a bottom plan view of the of the apparatus of FIG. 1.

FIG. 5 is a bottom plan view of the ribbon cartridge useful with the encoder apparatus of FIGS. 1–4.

FIG. 6 is a side-elevational view of a removable hammer useful with the encoder apparatus of FIGS. 1–4.

FIGS. 9–38 comprise a flow chart for the software control of the apparatus of FIGS. 1–4.

BEST MODE FOR CARRYING OUT THE INVENTION

Figure 1:
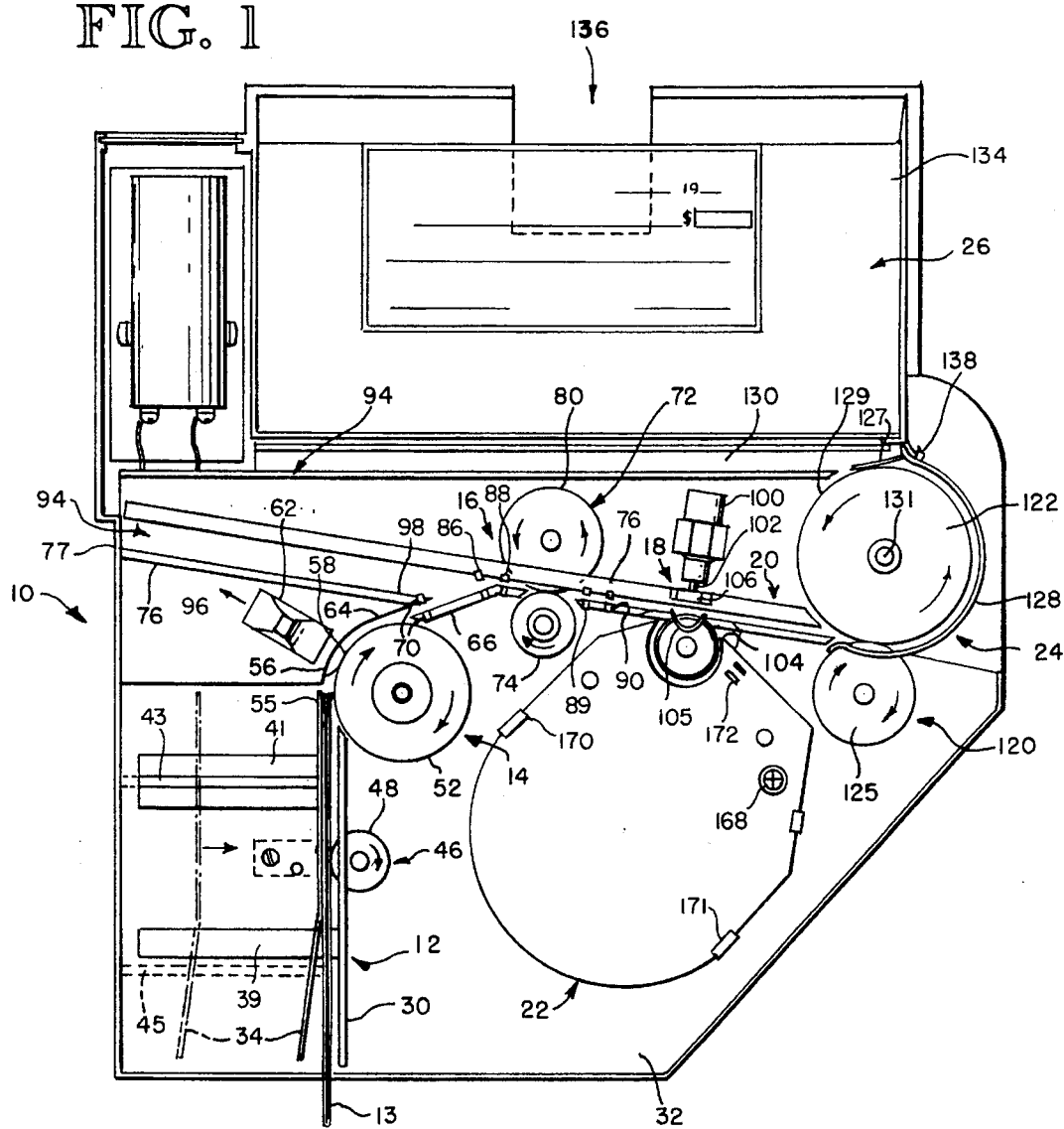
FIG. 1 is a top plan view of the encoder apparatus of the present invention.

FIGS. 1–4 show in general the structure of the encoder of the present invention. Referring to FIG. 1 in particular, the apparatus, shown generally at 10, includes an autofeed tray assembly 12 where a number of checks may be stored for encoding. An autofeed roller assembly is shown generally at 14, while a check encoding system, positioned downstream of the autofeed roller assembly 14, includes a first drive assembly 16, a printing assembly 18 and a second drive assembly 20. A ribbon cartridge 22 forms part of the printing assembly 18. Downstream of the check encoding system is a check eject assembly 24. Lastly, downstream of the check eject assembly 24 is a check catch assembly 26, which receives the checks after they have been processed through the apparatus.

The various assemblies described above are arranged so that the resulting encoder apparatus is quite compact and presents a relatively small footprint, yet is also very reliable in check processing operation and capable of extremely high throughput rates. The autofeed tray assembly 12 and the check catch assembly 26 furthermore are structurally integrated into the apparatus, i.e. they are not add-on or accessory units. Such an arrangement contributes to the compactness of the apparatus and improves the reliability of the apparatus.

Figure 3:
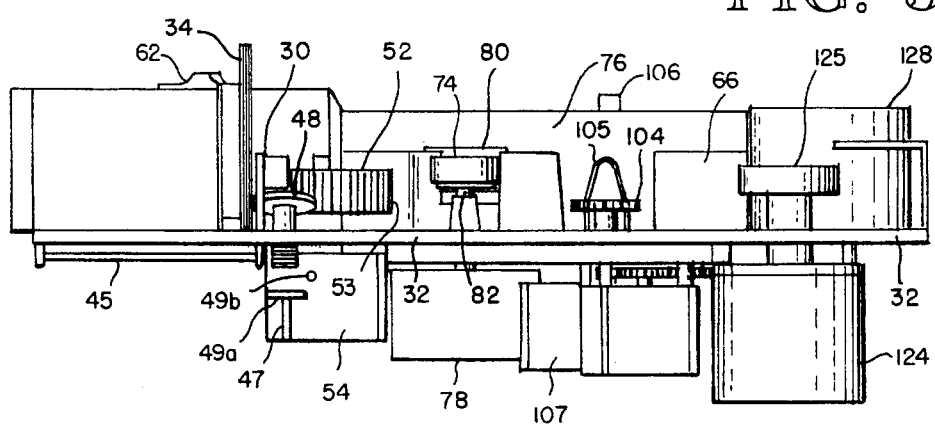
FIG. 3 is a side-elevational view of the apparatus of FIG. 1.
Figure 2:
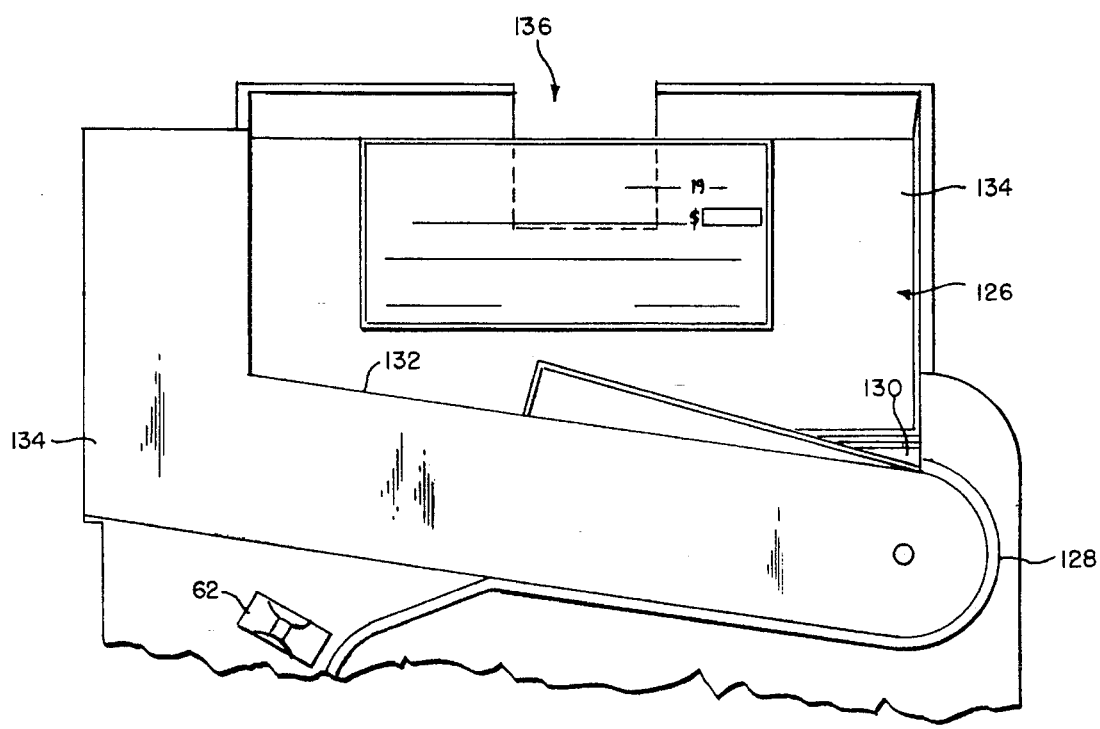
FIG. 2 is a top plan view of a portion of the encoder apparatus of FIG. 1, showing the top cover in place.
Figure 9:
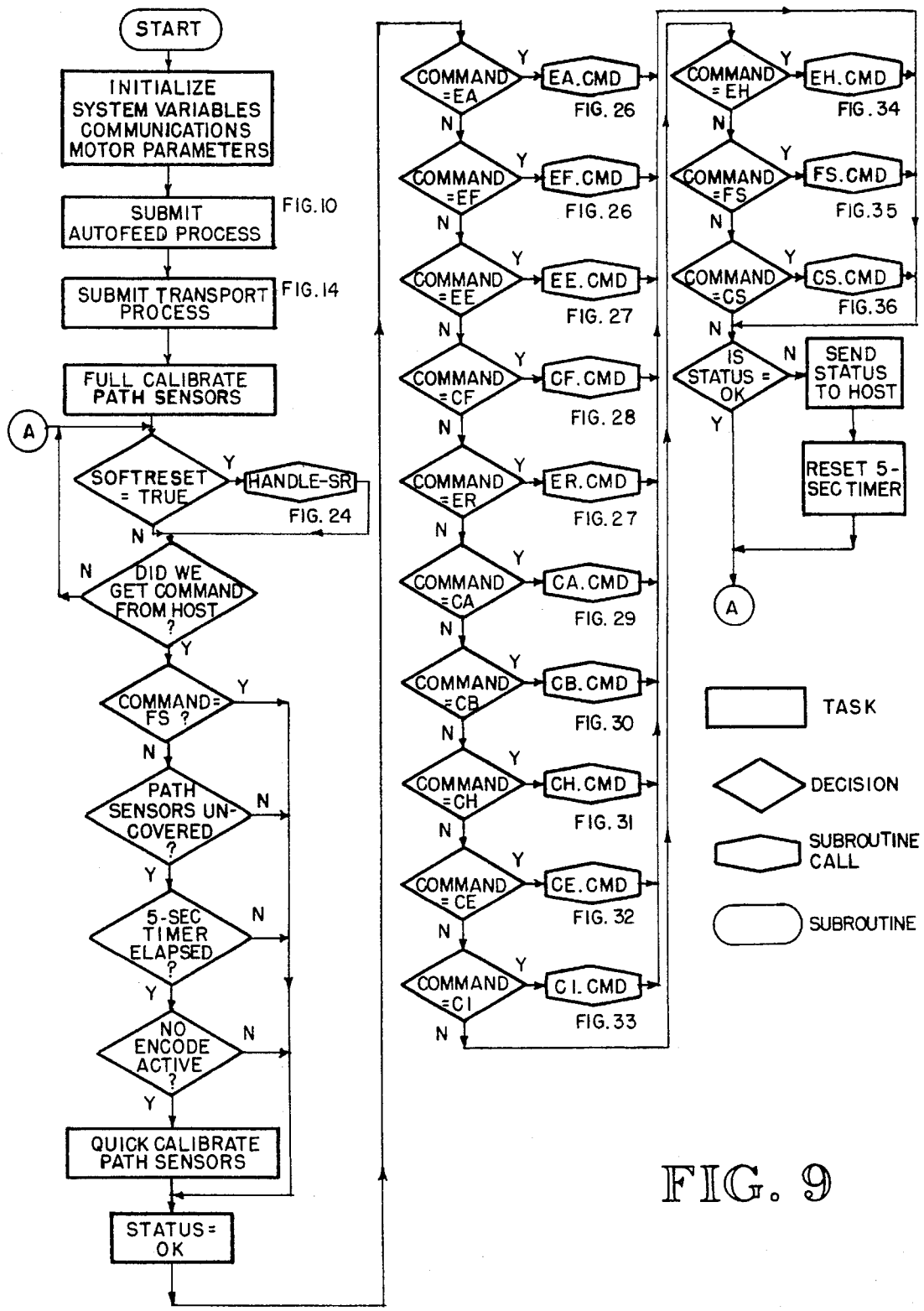
Figure 10:
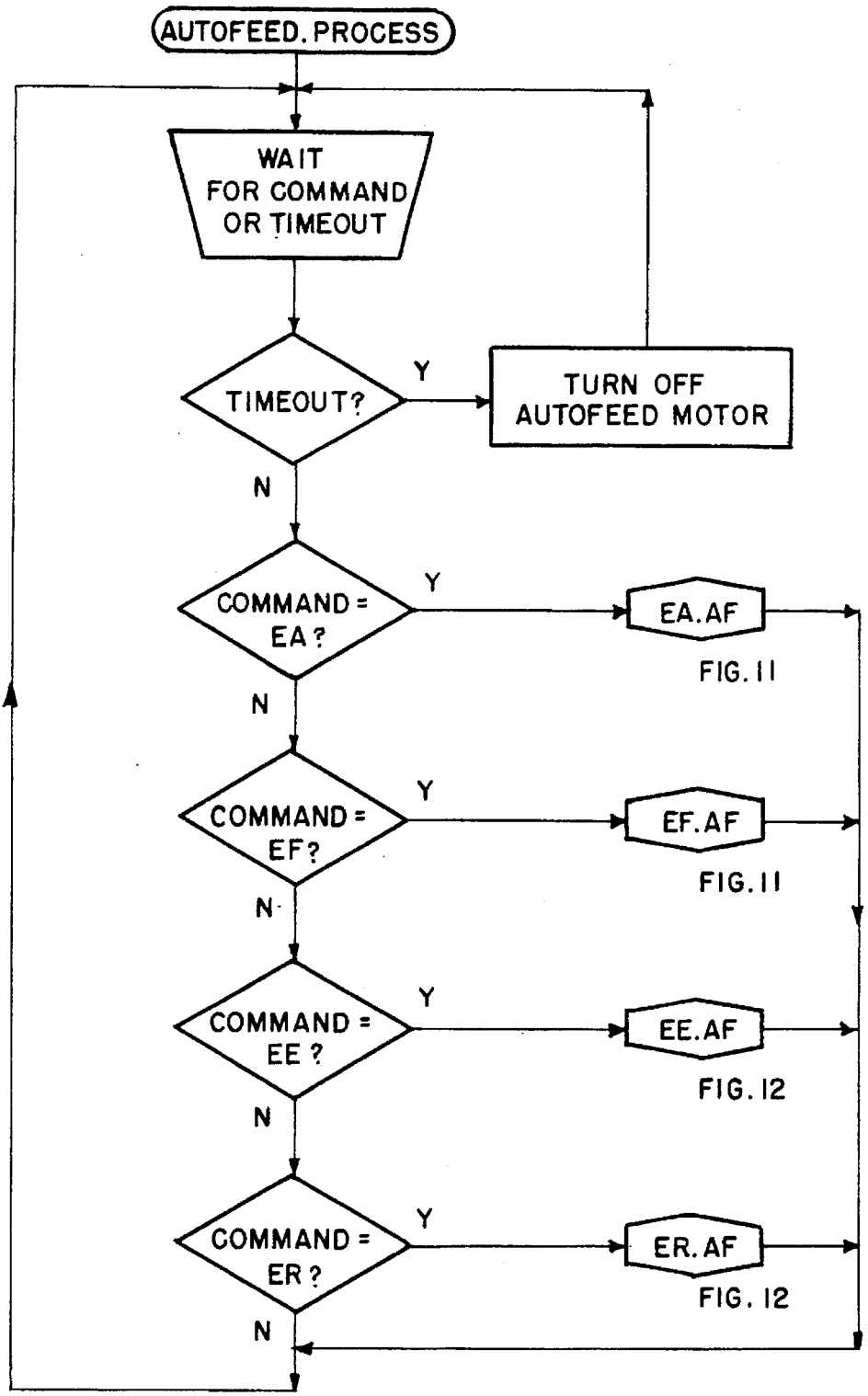
Figure 20:
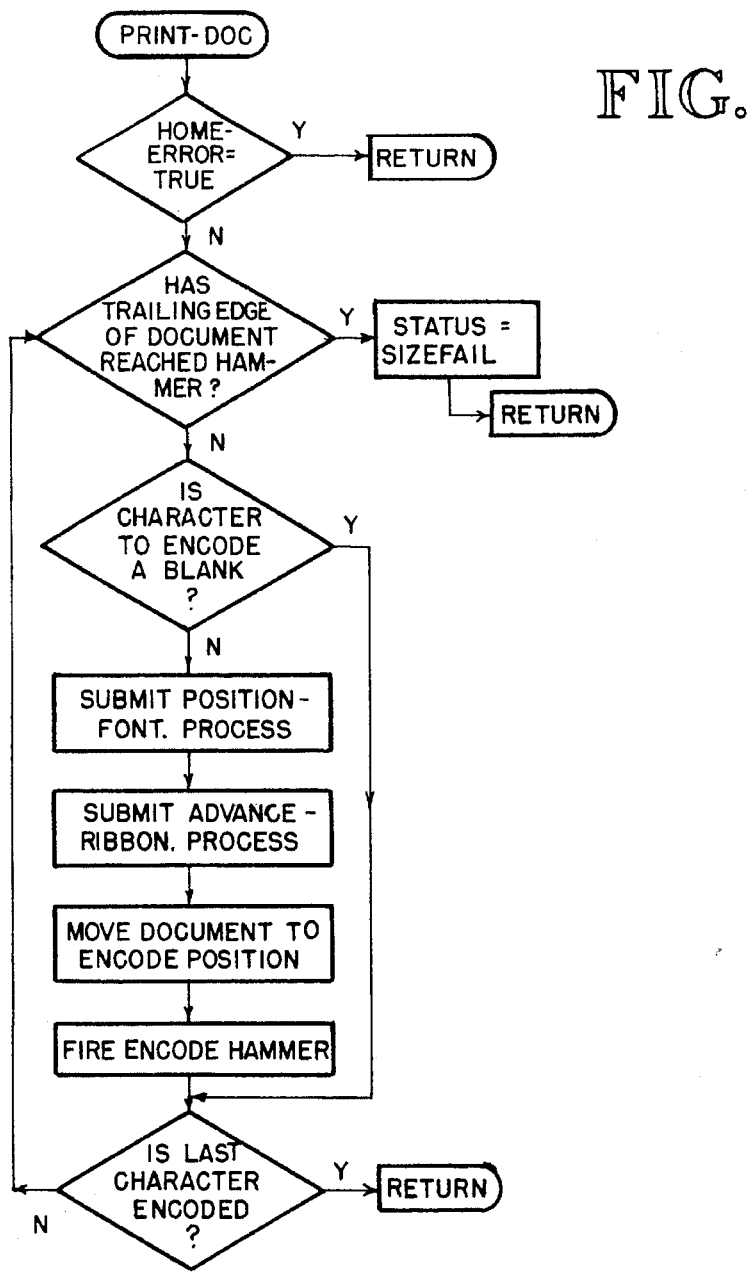
Figure 16:
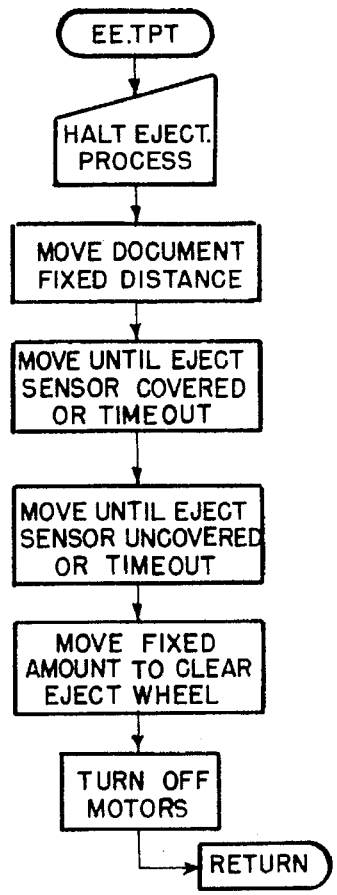
Figure 12:
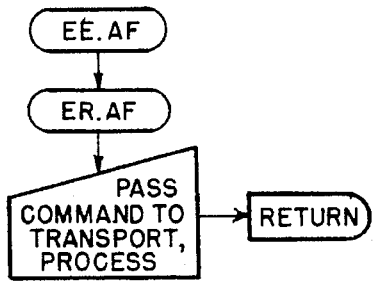
Figure 13:
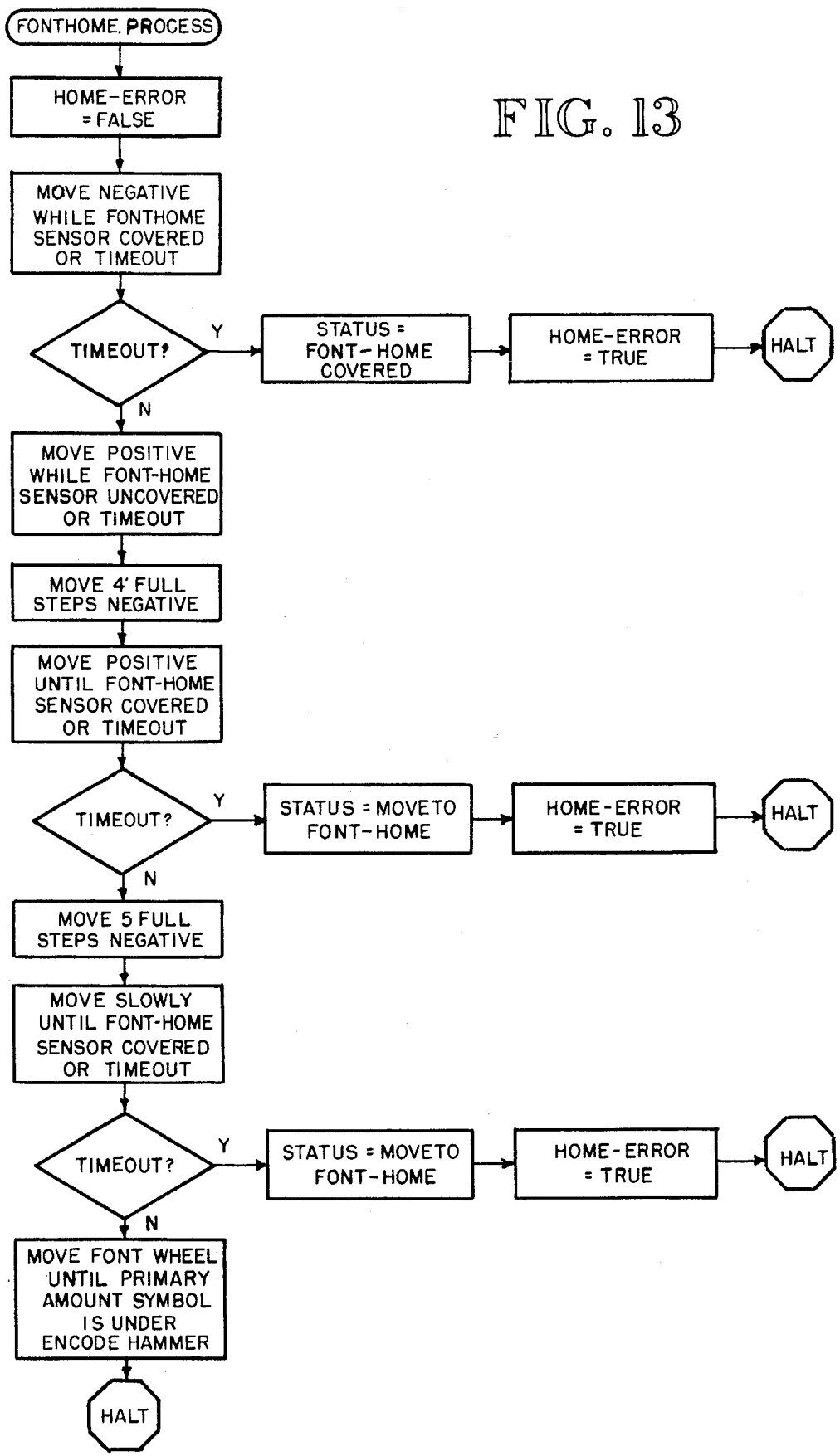
Figure 14:
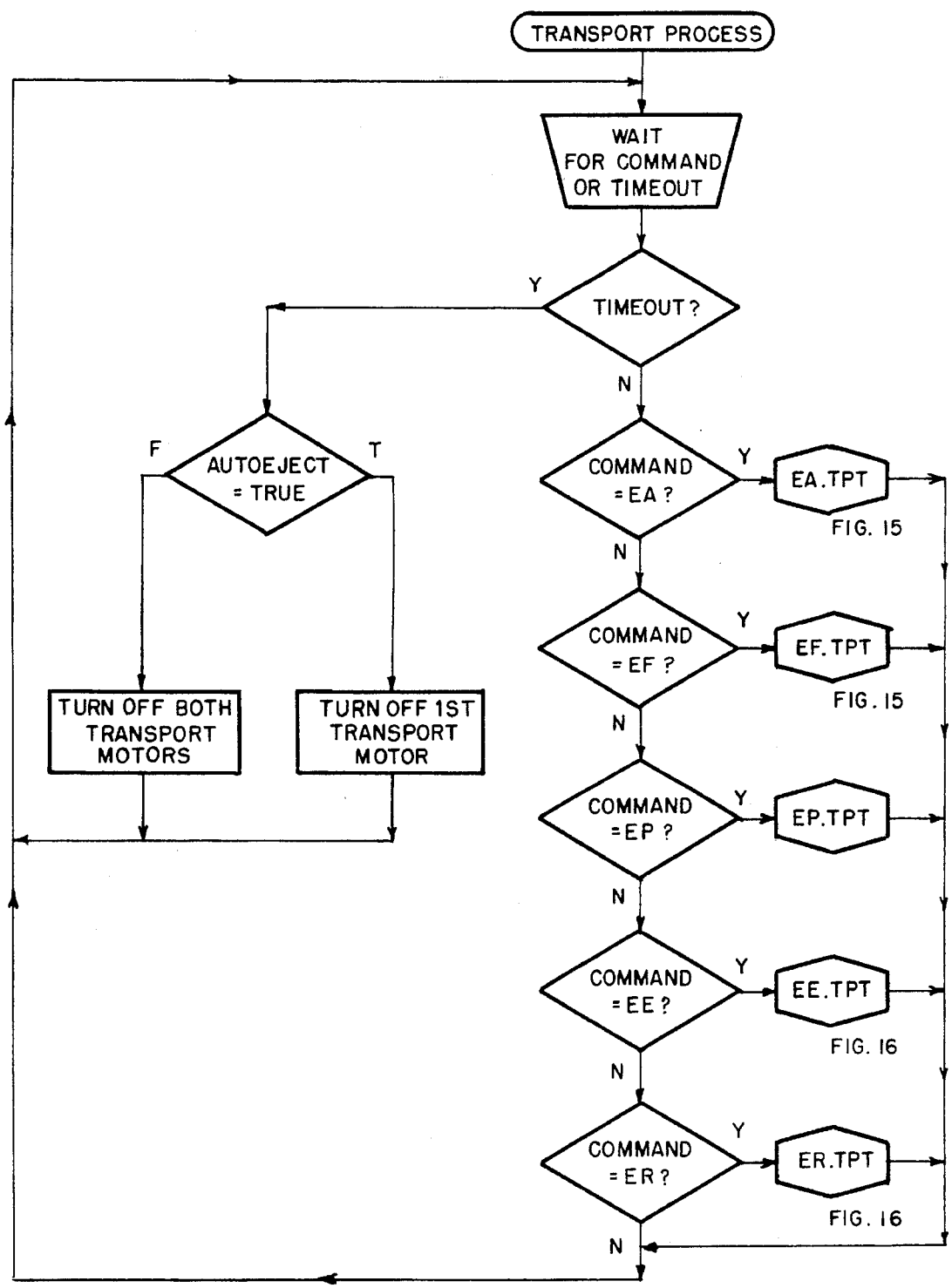
Figure 17:
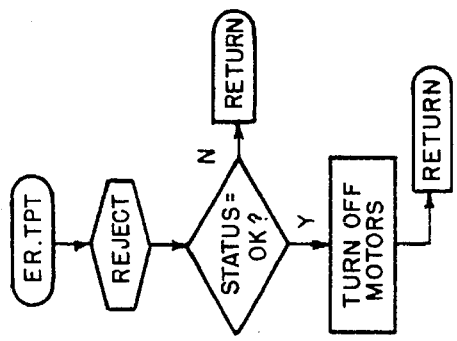
Figure 15:
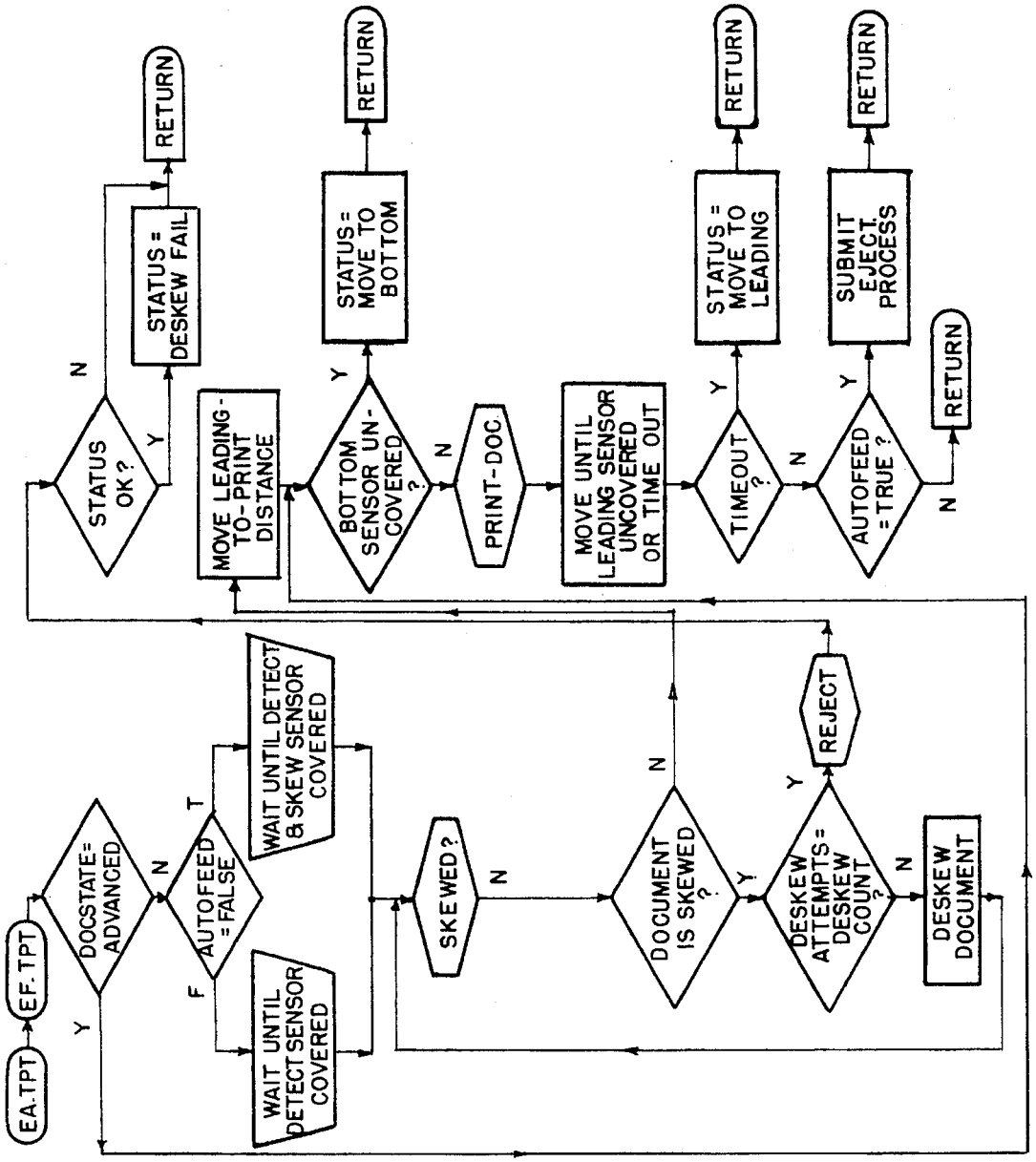
Figures 18, 22:
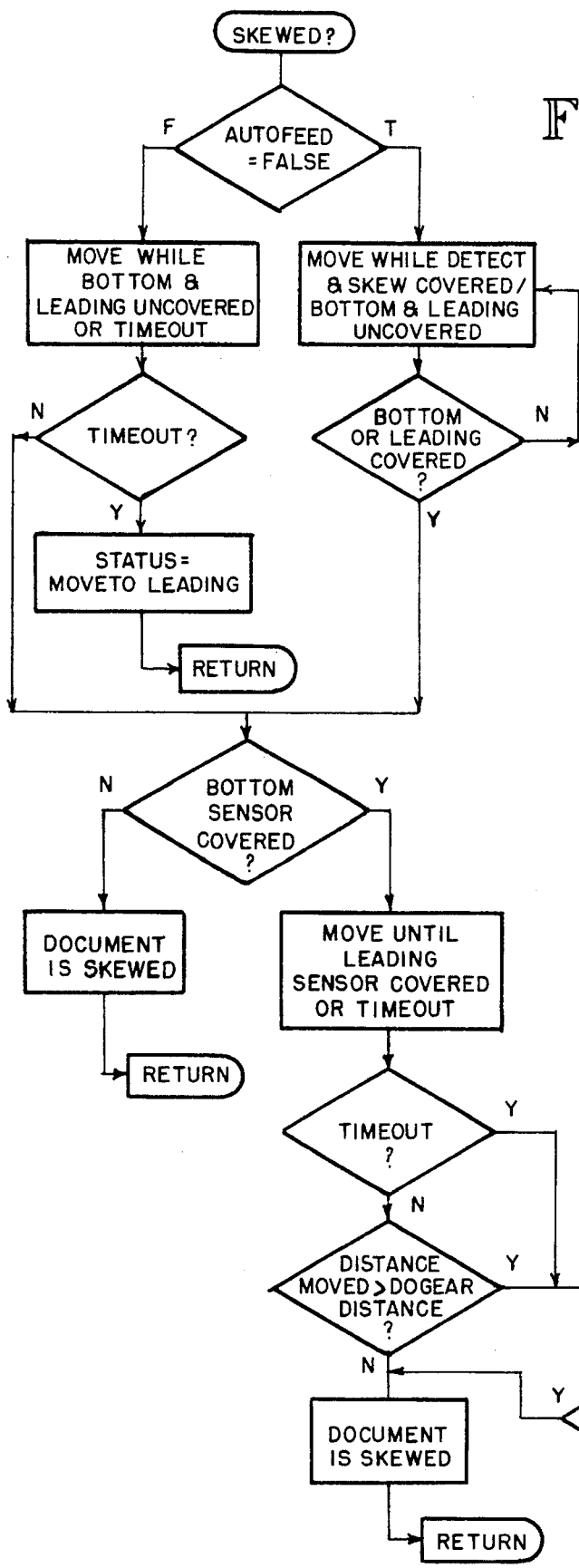
Figure 19:
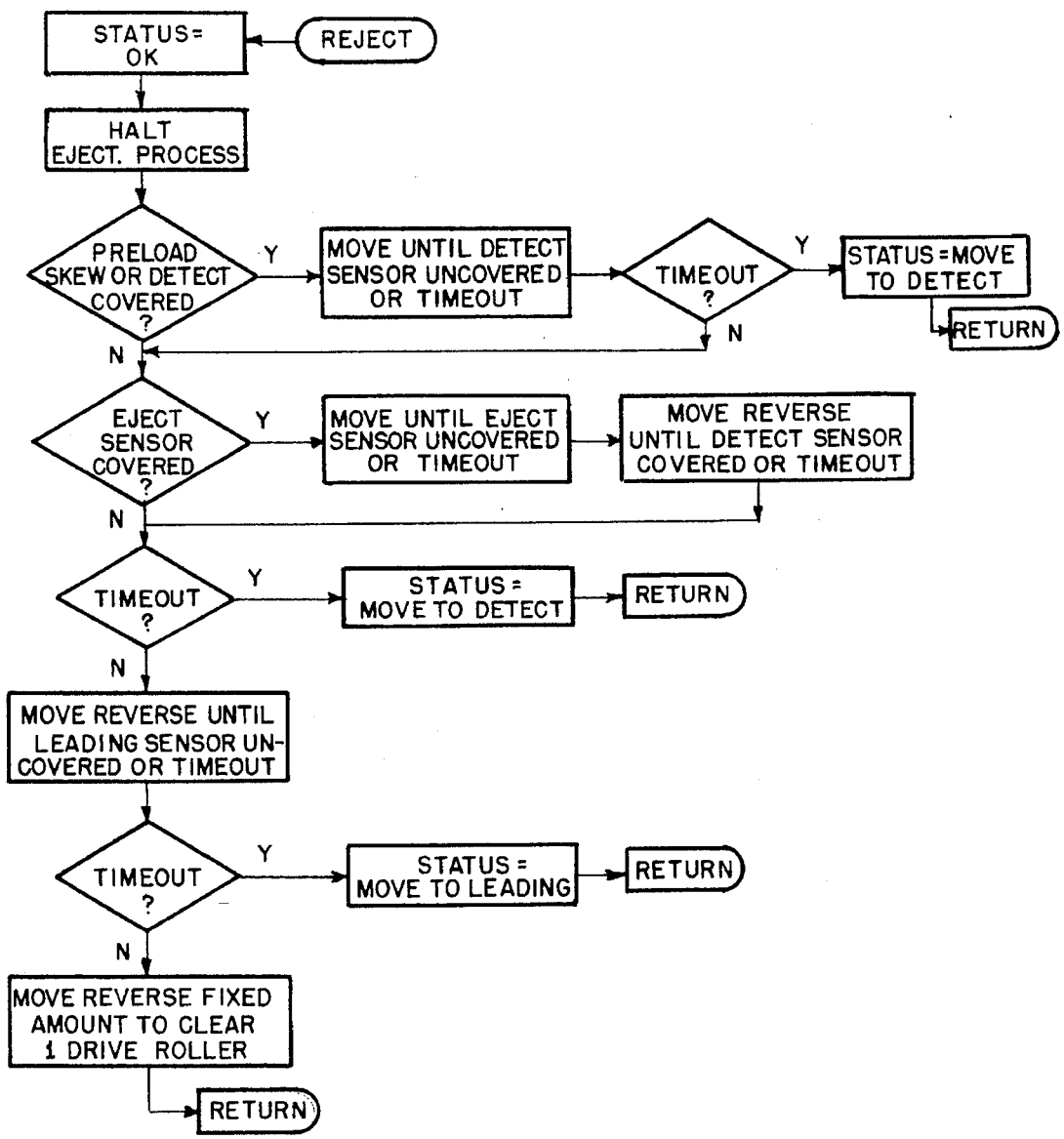
Figure 21:
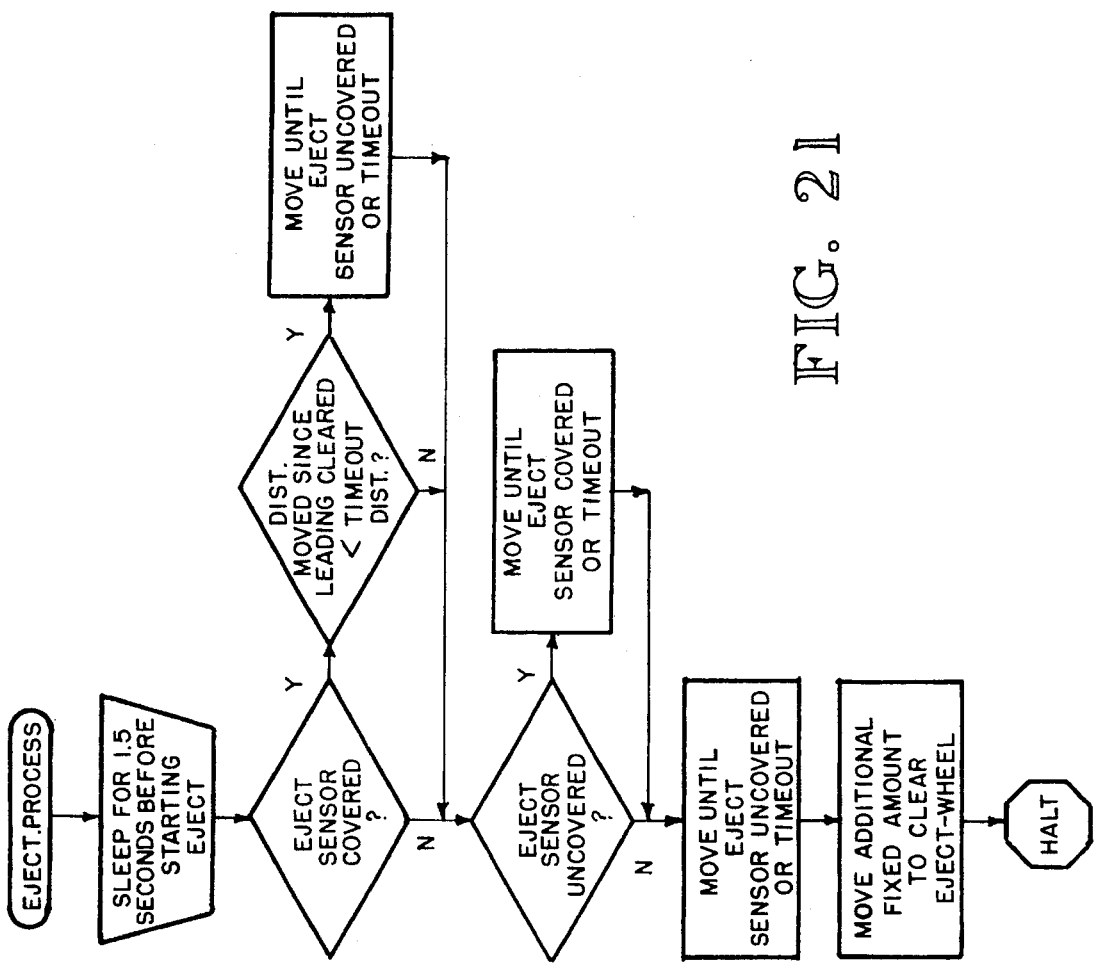
Figure 23:
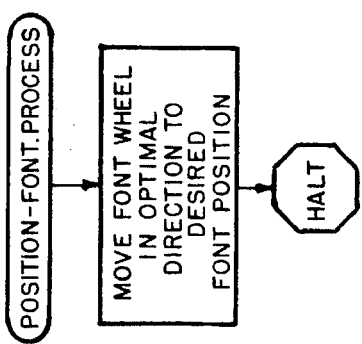
Figure 24:
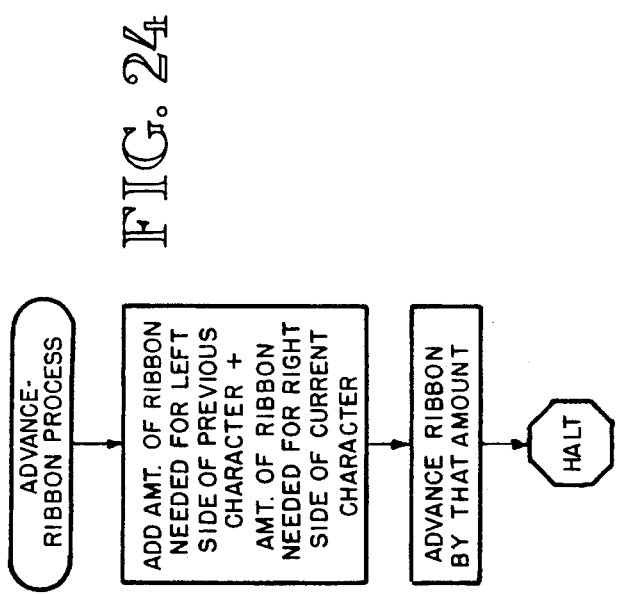
Figure 25:
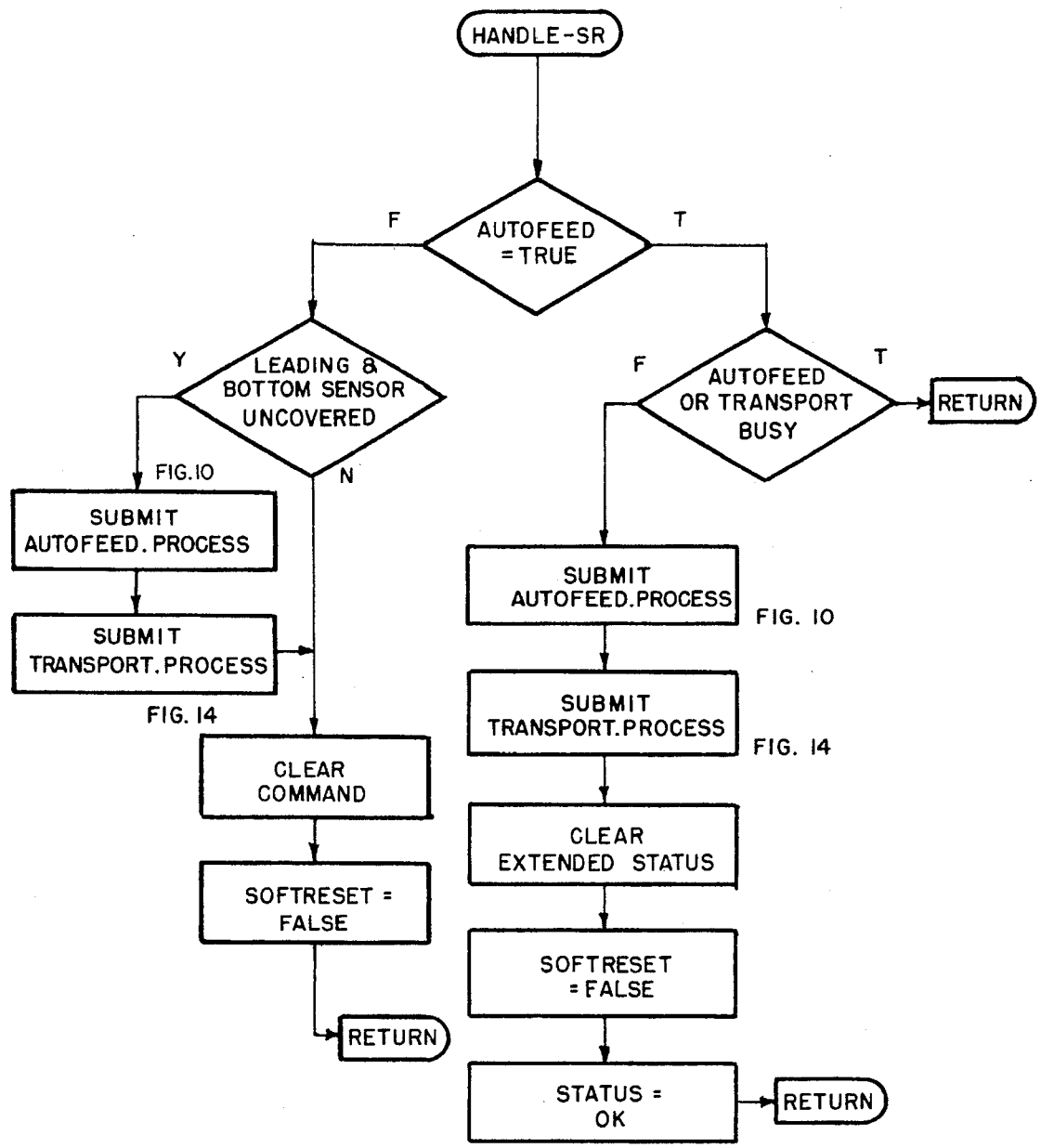
Figure 26:
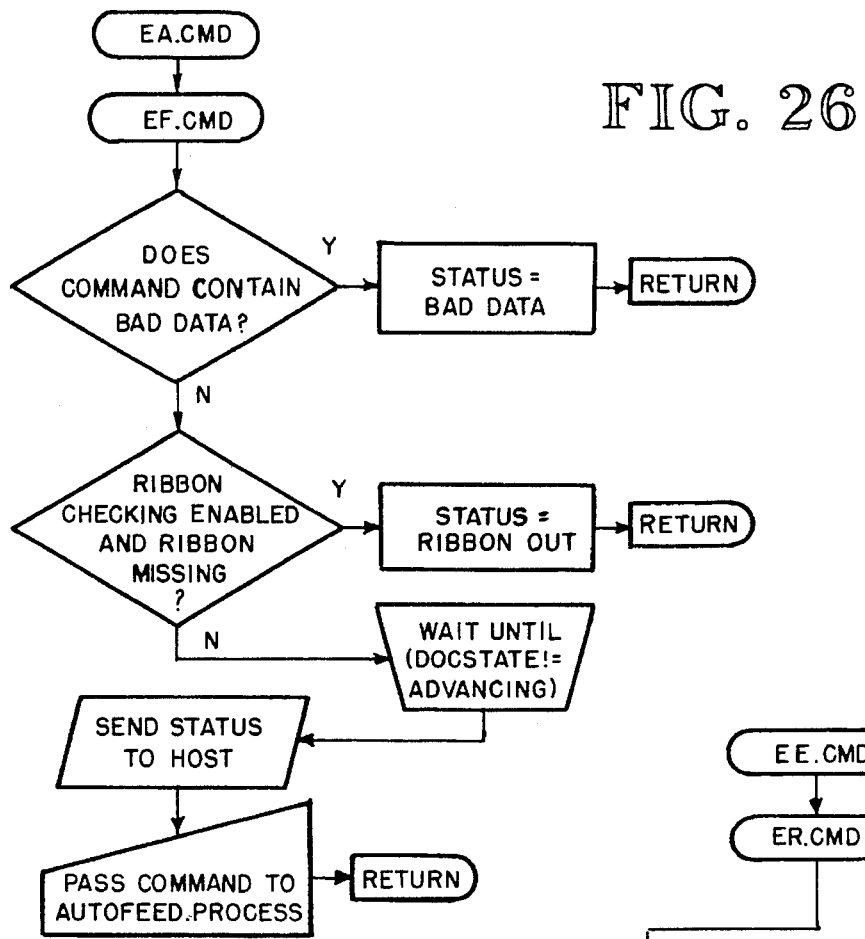
Figure 27:
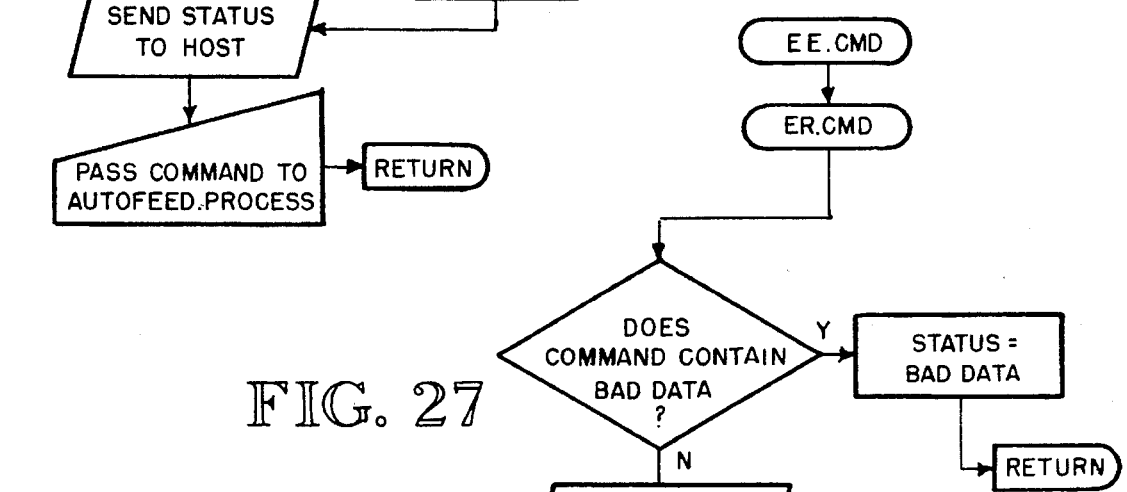
Figure 28:
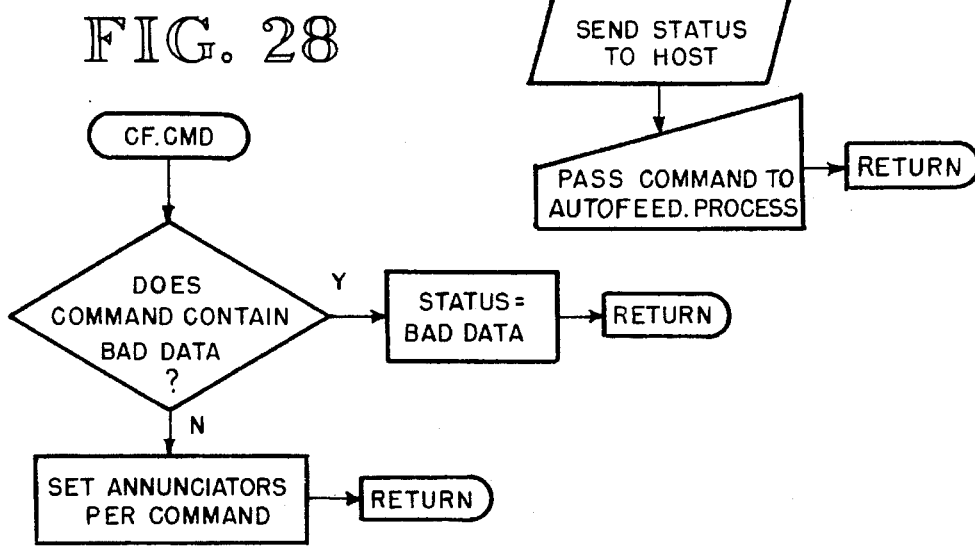
Figure 29:
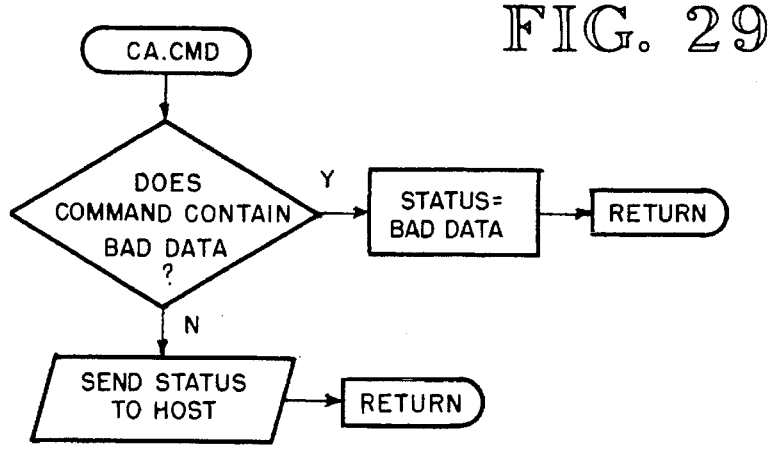
Figure 30:
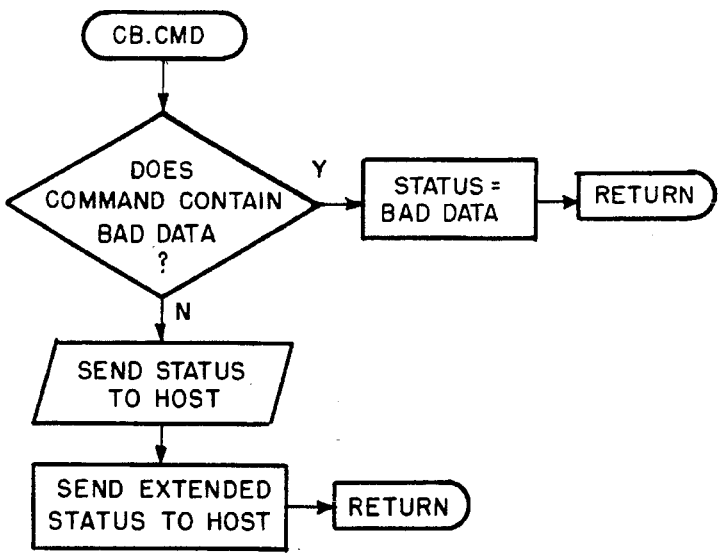
Figure 31:
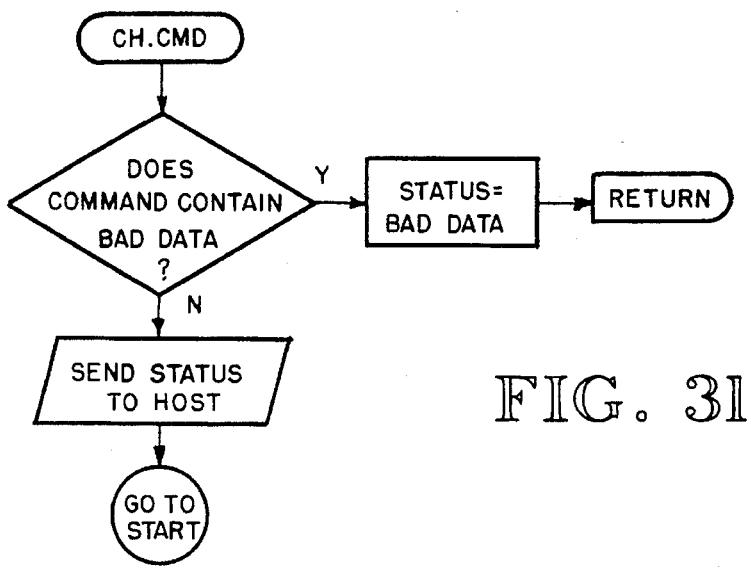
Figure 37:
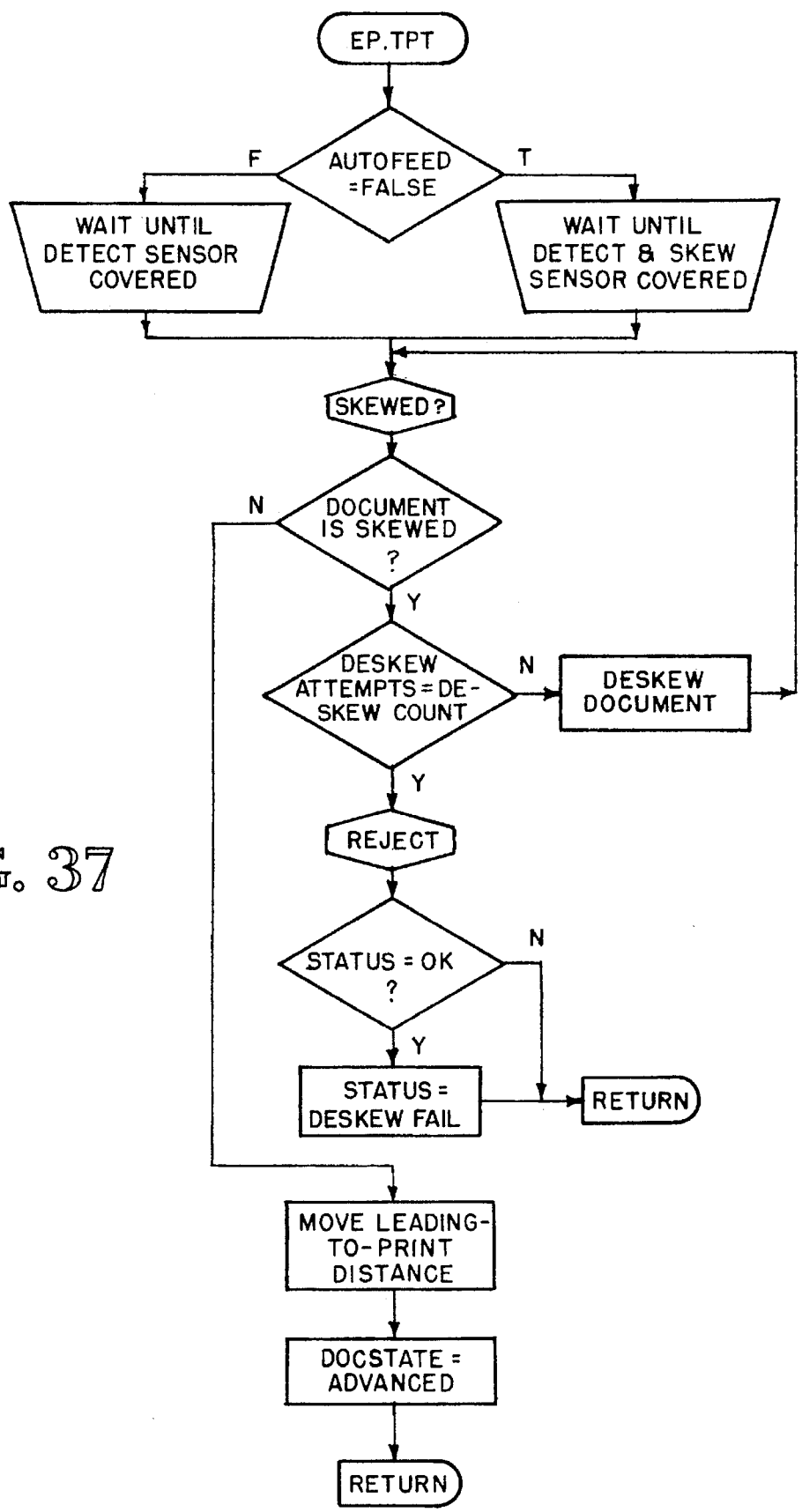
Figure 38:
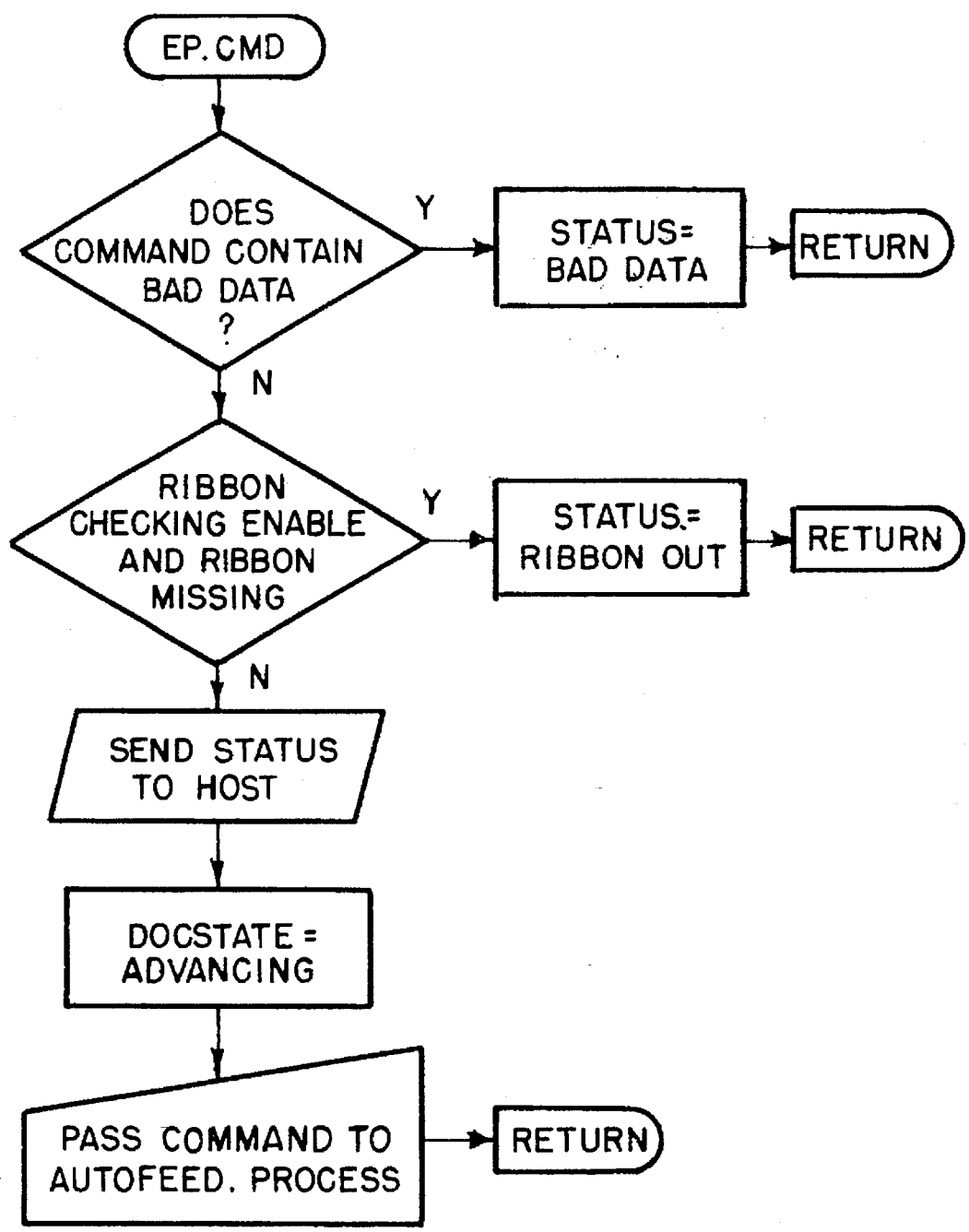

More specifically, referring to FIGS. 1–3, the autofeed tray assembly 12 includes a fixed reference plate 30 which in the embodiment shown extends in an upright position from a base plate 32 of the apparatus. Reference plate 30 is in the embodiment shown approximately 5 inches long and approximately 1-¼ inches high and in the embodiment shown is an integral part of base plate 32. To the left of reference plate 30 in FIG. 1 is a movable pressure plate 34. Extending from the lower edge of pressure plate 34 are two tabs 36 and 38 which extend through elongated openings 39, 41 in base plate 32 and are supported for slidable movement along two rods 45 and 43, such that pressure plate 34 is free to move away from and toward reference plate 30. Tab 38 is furthermore connected to a slidable block 29 to which is connected a solid wound, constant force spring member 40, which unwinds from spool 42 as pressure plate 34 is moved away from reference plate 30 to the left in FIG. 1. The action of spring member 40 tends to maintain pressure plate 34 against reference plate 30.

A substantial number of documents, such as checks, on the order of 150 to 200 in the embodiment shown, may be placed in the autofeed tray by moving pressure plate 34 away from reference plate 30 by hand and then positioning the checks, also by hand, between pressure plate 34 and reference plate 30.

Positioned approximately midway along the length of reference plate 30, and partially extending therethrough, is a deskewing roller 46 (FIG. 1). Deskewing roller 46 is spring-biased about a pivot point 51 through pivot assembly 49 (FIG. 4) in the direction of pressure plate 34, and includes a circular mounting element 48 mounted for rotation on a shaft 47 which extends through base plate 32 and is slightly inclined in the direction of the downstream end of reference plate 30. Mounting element 48 includes a urethane O-ring thereon, which contacts the front surface of the first check between reference plate 30 and pressure plate 34. As a check is moved into the check guide path from the autofeed tray, deskewing roller 46 tends to force the check downwardly so that its bottom edge is positioned against the upper surface of base plate 32, which defines the lower surface of the check guide path.

Mounted on shaft 47 is an encode wheel 49a which is a clear plastic disk with radially spaced dark bands. An autofeed sensor 49b is positioned to detect the presence/absence of the dark bands. Movement of the front-most document in the autofeed tray will turn the deskewing roller 46 and hence the encode wheel 49a. This movement is detected by the sensor 49b and transmitted to the software control. If the front-most document does not advance properly through the apparatus, as detected by downstream sensors, then an error is indicated, requiring operator intervention. This feature insures that the documents move out of the autofeed tray in proper sequence.

Positioned at the downstream end of autofeed tray assembly 12 is an autofeed roller 52, its associated drive motor 54, and a check stripper element 56. Autofeed roller 52 includes a rubber roller element 53 having a serrated edge, approximately 2 inches in diameter and approximately ½ inch high. Roller 52 includes a one-way clutch so that roller element 53 may be driven in only one direction (clockwise in the embodiment shown). Roller element 53 is free to turn on its mounting shaft, however, when drive motor 54, which is a stepper motor in the embodiment shown, is in an off condition.

The check stripper element 56 is approximately ½ inch square and is located immediately downstream of the pressure plate 34. The stripper element 56 has a 90 durometer cast urethane pad 58 on the front surface thereof, which in operation is in slight physical contact with the edge of roller element 53. Autofeed roller 52 moves the checks out from autofeed tray assembly 12. The rubber comprising roller element 53 is flexible and tends to grab the check better than urethane pad 58. Stripper element 56 (with pad 58) is mounted so that it moves horizontally toward and away from the edge of roller element 53. Stripper element 56 is mounted on an arm 59 which extends vertically downwardly through base plate 32 and then extends horizontally to a pivot point 60 on the under surface of base plate 32. A spring 62 tends to bias arm 59 clockwise, so that pad 58 is in contact with roller element 53. The horizontal portion of arm 59 beneath base plate 32 has a notch 63 in one edge thereof. Slidable block 29 has a first pin 65 extending downwardly from the lower surface thereof.

Movement of pressure plate 34 away from reference plate 30 results in pin 65 nestling in notch 63, with arm 59 then rotating about pivot point 60, with corresponding movement of stripper element 56, until arm 59 locks in position, with pin 65 still in the notch, such that pressure plate 34 is held a distance away from reference plate 30. When the checks have been inserted between plates 30 and 34, a finger tab 62 which extends from the vertical portion of arm 59 and is accessible to the user is moved slightly to the rear, which releases arm 59, permitting arm 59 to move clockwise, resulting in pad 58 contacting roller element 53. Pressure plate 34 also moves against the stack of checks, by virtue of the action of spring 40.

To assist in the initial movement of checks from the autofeed tray is a small non-asbestos pad 55 located at the lower rear corner of pressure plate 34. The leading edge of the checks thus tend to be pushed toward autofeed roller 52. The frontmost check in the autofeed tray comes into contact with the edge of the autofeed roller.

Figure 8:
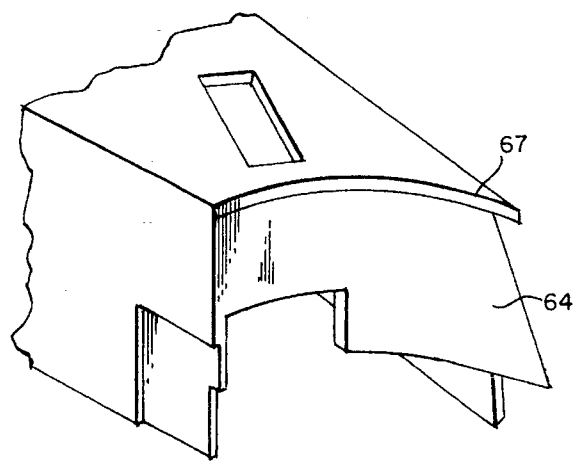
FIG. 8 is a perspective view of a part of a top cover/arcuate wall portion of the encoder apparatus of FIGS. 1–4

Surrounding stripper element 56 is a curved rear wall section 64 which extends through an arc of approximately 80° to 85°. This wall section forms, along with base plate 32, the initial part of the check guide path along which the check moves through the apparatus following removal from the autofeed tray. Referring now to FIG. 8, at the top of wall section 64 is an extending lip 67. Lip 67 is approximately 1/10 inch thick, and at the rear edge of wall section 64, extends outwardly therefrom approximately 60/1000's of an inch. The amount of outward extension increases gradually from zero at the front edge of wall section 64. Lip 67 also extends beyond the rear edge of wall section 64 approximately 1/10th inch. The lip adds a slight twist to the document which keeps the document down against base surface 32.

A second, following section of the check guide path is formed by a plastic forward wall member 66, which extends downstream from roller 52 through the encoder assembly region. Wall member 66 defines the front wall portion of the second section of the check guide. Positioned in an initial portion of wall member 66 is part of a preload sensor assembly 70. Preload sensor assembly 70 comprises a conventional LED/sensor pair positioned on opposite sides of the check guide. The function of preload sensor assembly 70 is discussed below. Sensor assembly 70, as well as the other sensors in the present apparatus, are mounted on blocks which are then set into wall members defining the check guide. The portions of the wall members containing the sensor assemblies are transparent.

The angle of contact between the check and the autofeed roller from its initial contact to the point where the check moves along the check guide path away from the autofeed roller is in the embodiment shown 73°. An acceptable range is 65° to 95°. This angle is important in maintaining high document throughput and reliable operation. Downstream of autofeed roller 52 is a first drive roller 72, which is driven by a motor 78, and an associated pressure roller 74, which together define a first encoder roller assembly. Wall member 66 at this point angles 20° to 30° (approximately 26° in the embodiment shown) away from the initial portion thereof toward the front of the apparatus, slightly before the first drive roller 72, such that it extends slightly (5°–15°) toward the front of the apparatus, becoming parallel with and positioned a short distance in front of wall member 76, which defines a rear wall portion of the check guide path. Wall member 76 is a flat metal plate which extends from the left edge 77 of the apparatus to the eject roller 24, at a slight angle toward the front of the apparatus. The first drive roller 72 is approximately at a longitudinal midpoint of wall member 76. In the embodiment shown wall member 76 is approximately 11 inches long by 1-½ inches high.

The first drive roller 72 is driven by a stepper motor 78 as indicated above and includes an aluminum roller element 80, which in the embodiment shown has a diameter of approximately 1-¼ inches and is ⅜ inch high. The peripheral edge of roller 80 has a metal particle gripping surface, which provides a good gripping capability for the check and prevents slipping of the check. This arrangement provides positive control over the movement of the check into and through the encoder assembly area.

The pressure roller 74, which mates with roller 80, is mounted for rotation about a vertical mounting post 82. Roller 74 includes a polyurethane roller element which is relatively soft and is angled slightly downwardly. The mounting post 82 is connected to a lever arm 83 which extends through base plate 32 and then horizontally to a pivot arm 85, which in turn is pivotally mounted about pivot point 87. The pivot arm 85 is biased by a spring 89 in the clockwise direction. A second downwardly extending pin 91 on the lower surface of slidable block 29 contacts pivot arm 85 when pressure plate 34 is moved away from reference plate 30, rotating pivot arm 85 counterclockwise, with lever arm 83 being pulled with pivot arm 85, resulting in pressure roller 74 moving away from contact with roller element 80. It remains in this position when pressure plate 34 is moved sufficiently that arm 59 and block 29 lock in position. Pivot arm 85 is released when tab 62 releases arm 59 and block 29. When arm 59 is locked, so that pressure roller 74 is maintained away from roller element 80, check jams may be readily cleared.

Positioned before drive roller 72 and pressure roller 74 are, in sequence, a deskewing sensor assembly 86 and a detect sensor assembly 88. The deskewing sensor assembly 86 is located near base plate 32 while detect sensor assembly 88 is located a short distance up from base plate 32. Both deskewing sensor 86 and detect sensor 88 comprise LED/sensor pairs.

In autofeed operation, a check is moved by autofeed roller 52 past deskew roller 46 from the autofeed tray to the point where the leading edge of the check is recognized by the preload sensor assembly 70, following a previous recognition that sensor 70 is "clear". At this point, the check is stopped by the autofeed roller 52, until the previous check has completely cleared detect sensor 88. The check is then moved by the autofeed roller to the point where the leading edge of the check is recognized by detect sensor 88.

Immediately downstream of first drive roller 72 and pressure roller 74 is a bottom edge (dog-ear) sensor assembly 89, followed by a leading edge sensor assembly 90. Bottom edge sensor 89 and leading edge sensor 90 are positioned relative to base plate 32 similarly, respectively, to deskew sensor 86 and detect sensor 88. Sensors 89 and 90 also each comprise an LED/sensor pair. When the previous check clears leading edge sensor 90, autofeed roller 52 will again operate, for a fixed number of steps of the autofeed roller stepper motor, specifically the number of steps necessary to move the check a sufficient distance to where the first drive roller 72 achieves control over the check. The autofeed roller 52 is then turned off, and the document is under the control of the first drive roller 72. The one-way clutch on the autofeed roller permits the check to be "pulled" from the autofeed roller by the action of drive roller 72.

As the check moves further along the check guide path it is under the control of the first drive roller, which advances the check to leading edge sensor 90. Prior to stopping at the leading edge sensor 90, the check passes bottom edge sensor 89. The number of steps of stepper motor 78 required to move the check from bottom edge sensor 89 to leading edge sensor 90 is determined. If the number of steps is not within a certain range, a tear or a dog-ear in the bottom of the check at the leading edge thereof is indicated. The dog-eared check is then advanced until the trailing edge thereof passes detect sensor 88. The check is then moved back past first drive roller 72 into a hand drop/reject portion of the apparatus, shown generally at 94 in FIG. 1 and then out of the apparatus at the left hand side thereof. Portion 94 is defined between third wall member 76 and a fourth wall member 96 which is positioned just forwardly of third wall member 76 in FIG. 1 and which at one end 98 thereof joins the downstream edge of curved wall portion 64.

The hand drop/reject portion 94 also provides an opportunity for the operator to direct, i.e. drop, a check or other document into the apparatus directly, instead of it being fed from the autofeed tray. In this mode of operation, a check or other document is placed into the hand drop/reject portion 94 by the operator. The check is then moved along the check guide path by the operator until the deskew and detect sensors 86, 88 are both covered. The drive roller 72 then turns on and the check is further moved by the operator until the drive roller 72 grips the check, following which the check is controlled by the apparatus.

When the leading edge of the check has been detected and the check has been stopped at leading edge sensor 90, deskew sensor 86 is checked. If the sensor 86 is not blocked, indicating that the check is in fact skewed, the check is backed up by the first drive roller 72 and then advanced again to the leading edge sensor. If the check is still skewed, this process may be repeated a selected additional number of times (typically a total of 3 times). If the check is still skewed, it is then rejected as described above for dog-eared checks.

When the leading edge of a non-dog-eared, non-skewed check reaches the leading edge sensor 90, the check is ready to be encoded.

In typical use of the encoder of the present invention, such as the encoding of checks, an operator will first read the amount on the face of the check and will then begin to key in the amount into the system, i.e. the cash settlement host computer system, which controls the operation of the remote encoder. Typically the check will not be advanced to the encoder portion of the apparatus until the operator has completed entry of the data and has operated the "enter" key. In the present invention, however, the host system will advance the document to the encode position when the operator begins to key the amount into the system. Thus, by the time the operator has completed entry of the data, the check is aligned, positioned and ready to be encoded. This results in a significant increase in document throughput, up to a 20% increase. The encoder assembly includes a solenoid 100 with an extending actuator arm 102. Solenoid 100 is mounted to the rear of third wall member 76. Mounted in front of wall member 66 and partially extending through an opening therein is a conventional font wheel 104, controlled by a stepper motor 107, the font wheel having a plurality of characters thereon, the characters being in compliance with banking regulations concerned with checks. A wire form spring 105 extends upwardly from an edge of the opening in wall member 66, very close to wall member 76, maintaining the check in position in the check guide and the ribbon from the ribbon cartridge 22 in position as well. The font wheel 104 is controlled so that it initially moves to a base or home position when the check is advanced from preload sensor 70. This happens in conjunction with movement of the check. The control system for the apparatus thus at this point knows the position of the font wheel as well as the relative position of the check so that the check need be only moved a selected distance and encoding can begin at a precise point on the check.

Figure 7:
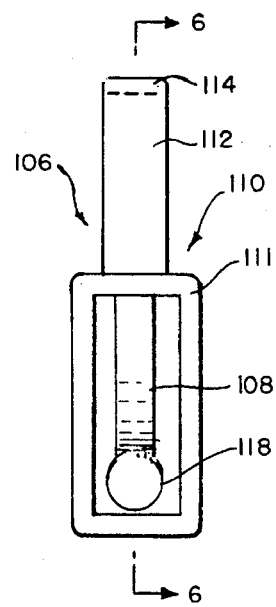
FIG. 7 is a front elevational view of the hammer of FIG. 6.

The hammer portion 106 of the encoder assembly is removably mounted in a slot in third wall member 76. FIGS. 6 and 7 show hammer assembly 106. It includes a hammer element 108 and a mounting frame portion 110. Frame portion 110 includes a relatively thin but rigid strip 111 forming a rectangle. In the specific embodiment shown, rectangle strip 111 is 1 inch long by ½ inch wide, with the strip itself being 0.080 inch square in cross-section. Frame portion 110 mates with a slot formed in third wall member 76. Extending from the upper end of rectangular strip 111 is an elongated arm 112 having a small tab 114 at the very top thereof. The arm 112 permits the entire hammer to be readily inserted and removed relative to the slot formed in third wall member 76. At the top of rectangular strip 111 is an extending lip 115 which butts against the top edge of wall member 76.

Extending downwardly from the lower end of arm 112 into the open center area of rectangular strip 111 is the hammer element 108, at the end of which is a contact element 118. Hammer element 108 has a slight curve to it so that contact element 118 is positioned somewhat out of the plane of rectangular strip 111, as shown most clearly in FIG. 6. Hammer element 108 is relatively thin, so that it is movable relative to the frame portion 110. At the top end of hammer element 108 is an extending button element 113 which is press fitted into a mating opening 117 in the lower end of arm 112.

The third wall member 76 has an opening therethrough which corresponds to the position of contact element 118 when the hammer 106 is correctly inserted in the slot in third wall member 76. In operation of the encoder, font wheel 104 is rotated to the point where the desired character to be printed on the check is in registry with the contact element 118 and the opening in the third wall member. The solenoid 100 is then energized, forcing the solenoid arm 102 forward, striking the contact element 118 which in turn moves forward with substantial force against the document, forcing it and the intermediately positioned ribbon against the character on the font wheel, such that the ink on the ribbon releases, producing the character on the check. This process, involving the successive advancement of the check, the rotation of the font wheel, advancement of the ribbon and activating of the solenoid, resulting in the encoding of successive preselected characters on the check, continues until all the desired encoding has been completed.

The check is then moved further along the check guide by first drive roller 72 until it encounters second drive roller 120 which operates in combination with eject roller 122, which together define a second encoder roller assembly. Second drive roller 120 includes a stepper motor 124 and an aluminum roller 125 which is substantially identical to roller 80. The distance between drive rollers 72 and 120 is such that the check will always be under the control of one drive roller and for a time will be under control of both drive rollers. Further, the overall arrangement of the check guide path is sufficiently compact that encoding of the check can begin before the check is completely free from the autofeed roller. Eject roller 122 includes a roller element 129 of plastic, approximately 2-½" in diameter by ¼" thick, the roller element having an O-ring positioned in a peripheral groove thereof. Roller element 129 is free to rotate about a vertical axis 131. The check, upon reaching the eject roller 122 and second drive roller 120, wraps around eject roller element 129, between the urethane O-ring in the edge thereof and a fifth wall member 128. Drive roller 120 extends through an opening in the fifth wall member 128 to contact the roller element 129. The check comes off the eject roller at the other side thereof, such that the check is now moving in substantially the opposite direction, fifth wall member 128 being slightly more than hemispherical.

At the end of fifth wall element 128 is a flexible flap 127 which maintains the check in line as it comes off the eject roller, moving toward the left of the apparatus in FIG. 1, in document eject channel 130. Channel 130 inclines slightly upwardly from right to left in FIG. 1. The top portion of the check encounters an angled edge 132 (FIG. 2) of an upper surface, i.e. cover, plate 134 of the apparatus, forcing the check to fall backwardly out of channel 130 into a catch tray 134, with the checks landing flat and face down, as shown in FIGS. 1 and 2.

In operation of the apparatus, the encoded checks form a pile in the catch tray 134. The checks may be conveniently removed via a large slot 136 at the rear of the catch tray. As the checks pass from the eject roller 122, an eject sensor 138 senses that the trailing end of the check has left the roller.

The control of the apparatus is accomplished by software in a dedicated microprocessor via electrical commands to the various elements, using information provided by the various sensors. The various sensors are automatically calibrated, on a regular basis, typically in a particular sequence to prevent cross-talk, by detection of the level of light reaching the light detector portion of each sensor assembly from the LED (light emitter) portion. Light detection failure and/or LED failure can thereby be detected; further, if a low light level is detected, the electrical current to the sensor assemblies is automatically increased in order to increase the light level for proper operation.

A software flow chart for the control of the apparatus is shown in FIGS. 9–38. All the functional steps described above are set forth in the flow chart.

FIG. 5 shows a novel ribbon cartridge of the present invention. The ribbon cartridge shown generally at 140 includes a cartridge body 142 generally similar in outline to conventional cartridge bodies, but including a mid-element 144 which is a relatively thin, flat member positioned within the cartridge body at approximately mid-height thereof, dividing the interior of the ribbon cartridge into upper and lower compartments. In FIG. 5, cartridge 140 is viewed from the lower surface thereof. A conventional pancake ribbon 150 is positioned on a center spool 152 in the upper compartment with the center spool 152 being connected to an interior edge of the cartridge body by a spring element 154, which is a tensioning spring allowing the free turning of the pancake ribbon.

The ribbon is directed around a guide portion 156 of spring 154 near the interior edge of the cartridge body and then through a series of guide elements 158–161 positioned around a portion of the interior periphery of the cartridge body. At guide elements 159 and 160, the ribbon is gradually directed from the upper compartment to the lower compartment and at 161, the ribbon reverses direction to a take-up spool 162 in the lower compartment. Take-up spool 162 is mounted on one end of a spring 163 which has a pivot point 164 close to the interior wall of cartridge 140.

In the peripheral wall of ribbon cartridge 140 is an opening 166, across which the ribbon extends, between guide elements 158 and 159. It is this portion of the ribbon which is used for the encoding.

The ribbon is wound up on take-up spool 162 by rotation of a traction gear member 168. Take-up spool 162 is biased against traction gear 168 by spring 163. A motor engages gear 168, rotating it, forcing the ribbon to advance. As the ribbon is wound on the take-up spool 162, the take-up spool moves counterclockwise about pivot point 164 to accommodate the ribbon. This continues until the ribbon is completely wound up on the take-up spool 162.

The ribbon cartridge assembly also features two sensors associated with the operation of the ribbon cartridge. The first is a ribbon-out sensor. The ribbon-out sensor, referring to FIG. 1, includes an LED 170 and a light detector 171 positioned at opposite sides of the ribbon cartridge. They are positioned such that a straight line connecting them is slightly off the hub of the supply reel (when empty) for the ribbon, in the upper compartment of cartridge 140, when the ribbon cartridge is positioned in the encoder. As long as light between LED 170 and light detector 171 is blocked, ribbon is still present. When the detector 171 first recognizes light, the ribbon is nearly out, and it is now time to change the ribbon. However, the physical arrangement is such that there is still enough ribbon to completely process the one document then being encoded, unlike existing end of tape indicators, such as reflective coating.

The other sensor is known as a ribbon-in-motion detector, shown at 172, comprising an LED and a light sensor. The ribbon-in-motion detector detects that the ribbon is, in fact, still moving in the cartridge and has not jammed or otherwise malfunctioned. The ribbon-in-motion detector 172 is mounted on base plate 32 such that its LED/detector elements are located on opposite sides of the ribbon, relatively close to opening 166 in the cartridge. Detector 172 detects the absence of ink on the ribbon, where a character should have been lifted off during the encoding process. A moving ribbon will exhibit differences in the pattern of ink removal as different characters are encoded. Lack of change in the ink pattern on the ribbon is an indication that the ribbon is jammed or that the mechanism has otherwise malfunctioned, i.e. it is not moving.

Hence, a MICR encoder has been described which has a particular structural arrangement such that the resulting encoder is compact, integrated, reliable in operation, and easy to operate. Particular features include a removable hammer element and a new ribbon cartridge.

Although a preferred embodiment of the invention has been disclosed for illustration, it should be understood that various changes, modifications, and substitutions may be incorporated in such embodiment without departing from the spirit of the invention as defined by the claims which follow.

We claim:

1. A compact, remotely driven MICR encoder apparatus, comprising:

a tray for storing documents to be encoded;

a document path in which documents are moved through the encoder apparatus;

means positioned along the document path for encoding the documents;

means for moving the documents from the tray into the document path, wherein the documents in operation move around a portion of the document moving means, wherein the document path includes a first portion immediately downstream from the document moving means, extending therefrom at a substantial first angle relative to an entering orientation of the document as it initially contacts the document moving means, and wherein the document path includes a second portion downstream of the first portion thereof but prior to the encoding means, the second portion being at a second angle relative to the first portion;

means for moving the documents past the encoding means; and means for moving an encoded document away from the encoding means.

2. An apparatus of claim 1, wherein the apparatus has a front and a rear, and wherein the tray is arranged such that the documents are aligned in the tray such that each document extends in a direction front to rear of the apparatus, the documents being in said orientation when they are moved away from the tray by said means for moving the documents from the tray.

3. An apparatus of claim 1, when the first angle of the document path is within the range of 65° to 95° and the second angle of the document path is within the range of 20° to 30°.

4. An apparatus of claim 3, wherein the first angle is approximately 73° and the second angle is approximately 26°.

5. An apparatus of claim 1, wherein the means for moving the document past the encoding means includes first and second encoder roller assemblies positioned on opposite sides of the encoder means, and wherein the encoder means and the first and second encoder roller assemblies are positioned along the second portion of the document path.

6. An apparatus of claim 1, including a catch tray assembly for receiving documents which have been encoded.

7. An apparatus of claim 6, wherein the document tray and the catch tray assembly are integral portions of the MICR encoder.

8. An apparatus of claim 6, wherein the apparatus is arranged such that the document path extends through a substantial angle, approximately 180° from the second portion thereof, to the catch tray assembly, which is located at the rear of the apparatus.

9. An apparatus of claim 6, including a document eject channel located across a front edge of the catch tray, into which the document is moved following encoding thereof, and a cover element which is located above the channel and which includes a rear edge which extends at an angle across the channel, so that when the leading edge of the document encounters the read edge of the cover element, the document falls out of the channel into the catch tray assembly.

10. An apparatus of claim 9, wherein the document eject channel inclines slightly upwardly along the length thereof.

11. An apparatus of claim 1, including a document path reject portion which is located prior to the encoding means but is separate from the first portion of the document path and which extends away from the encoding means but in line with another portion of the document path, wherein documents may be moved away from the encoding means along the document path reject portion.

12. An apparatus of claim 1, wherein the encoder means includes a hammer element which may be removed by hand from the encoder means.

13. An apparatus of claim 12, including a wall member in the vicinity of the encoding means, the wall member including a slot in which is mounted the hammer element.

14. An apparatus of claim 12, wherein the hammer element includes a frame member having an open center area, a hammer member which extends down into the open center area from one side thereof and is movable to and from relative thereto, and an arm member extending upwardly from the frame member.

15. An apparatus of claim 14, wherein the hammer member is removable relative to the frame member.

16. An apparatus of claim 1, including a deskewing roller assembly which is positioned adjacent the feed tray, wherein the deskewing roller assembly includes a roller element which comes into contact with a document as it is moved by the feed roller and which is inclined slightly downwardly, thereby tending to force the document downwardly against the bottom of the check path at that point.

17. An apparatus of claim 16, including a sensor assembly associated with the deskewing roller for ascertaining movement of the deskewing roller.

18. An apparatus of claim 1, wherein the encoder means includes a cartridge ribbon and further includes sensor means for determining when the ribbon has been substantially completely used.

19. An apparatus of claim 18, wherein the ribbon sensor includes a light emitter and a light detector spaced on opposite sides of the ribbon cartridge, such that when a ribbon cartridge is inserted, light emitted from the light emitter will be prevented from reaching the light detector until substantially all the ribbon has been used.

20. An apparatus of claim 18, wherein the encoder means includes a ribbon cartridge and sensor means positioned to determine a change in ink remaining on the ribbon following encoding, so as to determine whether or not the ribbon is moving past the encoder means.

21. An apparatus of claim 1, wherein the document is a check.

22. An apparatus of claim 1, including means for initiating the advance of the document to the encoding means prior to the completion of entry of information to be encoded by the operator.

23. An apparatus of claim 1, wherein the means for moving documents from the tray includes a feed roller and wherein the means for moving the documents past the encoding means includes a first encoder roller assembly for receiving a document from the feed roller, a second encoder roller assembly positioned downstream of the encoding means, a first sensor assembly for detecting a document, means for controlling the feed roller to move a document to the first encoder roller assembly when the first sensor assembly no longer detects a previous document, a second sensor assembly for detecting a leading edge of a document, the second sensor assembly being downstream of the first sensor assembly in the document feed path, means for controlling the first encoder roller assembly for moving a document past the encoding means when the second sensor assembly no longer detects a previous document, and wherein the means for moving an encoded document away from the encoding means includes an eject roller located downstream of the second encoder roller assembly in the document feed path for moving a document away from the second encoder roller assembly, and a catch tray assembly for receiving documents from the eject roller.

24. An apparatus of claim 23, further including a preload sensor assembly, a deskewing sensor assembly and a bottom edge sensor assembly, wherein the preload sensor assembly is positioned just downstream of the feed roller, wherein the document is maintained at the preload sensor until the first sensor assembly no longer detects a previous document, and wherein the deskewing sensor is located slightly upstream of the first sensor assembly, and detects whether the document is correctly positioned against a bottom of the document feed path.

25. An apparatus of claim 23, wherein the feed roller includes a roller element made of rubber, with a serrated edge, and wherein the apparatus further includes a pad member positionable in slight physical contact with the feed roller, with the document passing therebetween.

26. An apparatus of claim 23, wherein the encoder roller assemblies each include a narrow metal roller and a stepper motor to drive the metal roller, the metal rollers having a gritty, peripheral surface, and wherein the first encoder roller assembly includes a plastic roller mounted spaced apart from the metal cylinder such that the plastic roller lightly contacts the peripheral surface of the cylinder, the document to be encoded passing therebetween.

27. An apparatus of claim 23, including a bottom edge sensor located slightly downstream from the first encoder roller assembly for ascertaining the start of a bottom edge of the document and for determining the distance between the start of the bottom edge and a point when the leading edge of the document is detected by the second sensor assembly, and for rejecting a document when said distance is not within preselected limits.

28. An apparatus of claim 25, wherein the eject roller includes a circular plastic roller element mounted for rotation, having a rubber O-ring mounted in its peripheral surface, the rubber O-ring being in contact with the gritty peripheral surface of the metal roller of the second encoder roller assembly.

29. An apparatus of claim 1, wherein the encoding means is positioned relative to the document moving means such that encoding of a document can be initiated while the document is still in contact with the document moving means.

30. An apparatus of claim 1, including an arcuate wall portion spaced a small distance from the document moving means, the arcuate wall portion including a lip at an upper edge thereof which extends a slight distance toward the document moving means, tending to prevent a document from rising during its movement past the document moving means.

31. A compact, remotely-driven MICR encoder, comprising:

a tray for storing documents to be encoded;

a feed roller for moving documents from the tray into a document feed path;

a first encoder roller assembly for receiving the document from the feed roller and moving the document through an encoder station;

a first sensor assembly for detecting a document;

means for controlling the feed roller to move a document to the first encoder roller assembly when the first sensor assembly no long detects a previous document;

an encoder station for encoding documents;

a second sensor assembly for detecting a leading edge of a document, the second sensor assembly being downstream of the first sensor assembly in the document feed path;

means controlling the first encoder roller assembly for moving a document through the encoder station when the second sensor assembly no longer detects a previous document;

a second encoder roller assembly positioned downstream of the encoder station in the document feed path;

an eject roller located downstream of the second encoder roller assembly in the document feed path for moving a document away from the second encoder roller assembly; and a catch tray assembly for receiving documents from the eject roller.

32. An apparatus of claim 31, wherein the document tray and the catch assembly are integral portions of the MICR encoder.

33. A removable hammer for use in document encoders which have a document guide path along which a document is moved within the encoder, an encoder station which includes a font wheel having characters thereon, a ribbon which in operation moves between the document and the font wheel and a solenoid for striking the hammer such that it moves the document and the ribbon against the font wheel with sufficient force to produce encoding of the document, the removable hammer comprising:

- a frame member defining an open center area, the frame member adapted to be removably supported in a receiving slot in the encoder station;
- a hammer element connected to and extending from the frame member into the open center area thereof and movable relative thereto when struck by the solenoid; and
- an arm member extending from the frame member, said arm member being separate from the hammer element, such that the hammer element and the frame member may be inserted add removed as a unit from the receiving slot in the encoder station by the arm member.

34. An article of claim 33, wherein the hammer element is removable relative to the frame member.

35. An article of claim 33, wherein the hammer element includes a contact portion and a remaining portion which is connected to the frame member, wherein the remaining portion is sufficiently elastic that the contact portion moves a short distance from an original position upon being struck by the solenoid and then returns to said original position when the solenoid is withdrawn from the contact portion.

36. An article of claim 33, wherein the removable hammer is made of plastic.

37. A removable hammer for use in document encoders which have a document guide path along which a document is moved within the encoder, an encoder station which includes a font having characters thereon, a ribbon which in operation moves between the document and the font wheel and a solenoid for striking the hammer such that it moves the document and the ribbon against the font wheel with sufficient force to produce encoding of the document, the removable hammer comprising:

- a frame member adapted to be removably supported in a receiving slot in the encoder station;
- a hammer element connected to and extending from the frame member and movable relative thereto when struck by the solenoid; and
- an arm member extending from the frame member, said arm member being separate from the hammer element, such that the hammer element and the frame member may be inserted and removed as a unit from the receiving slot in the encoder station by the arm member.

38. An article of claim 37, wherein the hammer element includes a contact portion and a remaining portion which is connected to the frame member, wherein the remaining portion is sufficiently elastic that the contact portion moves a short distance from an original position upon being struck by the solenoid and then returns to said original position when the solenoid is withdrawn from the contact portion.

\* \* \* \* \*